(12) United States Patent
Bedrich et al.

(10) Patent No.: US 12,724,429 B2
(45) Date of Patent: Sep. 1, 2026

(54) AUTOMATED IMAGING OF PHOTOVOLTAIC DEVICES USING AN AERIAL VEHICLE AND AUTOMATED FLIGHT OF THE AERIAL VEHICLE FOR PERFORMING THE SAME

(71) Applicant: Quantified Energy Labs Pte. Ltd., Singapore (SG)

(72) Inventors: Karl Georg Bedrich, Singapore (SG); Yong Sheng Khoo, Singapore (SG); Yan Wang, Singapore (SG)

(73) Assignee: Quantified Energy Labs Pte. Ltd., Singapore (SG)

( * ) Notice: Subject to any disclaimer, the term of this patent is extended or adjusted under 35 U.S.C. 154(b) by 22 days.

(21) Appl. No.: 18/285,943

(22) PCT Filed: Feb. 17, 2022

(86) PCT No.: PCT/SG2022/050071
§ 371 (c)(1),
(2) Date: Oct. 6, 2023

(87) PCT Pub. No.: WO2022/225449
PCT Pub. Date: Oct. 27, 2022

(65) Prior Publication Data

US 2024/0231391 A1 Jul. 11, 2024

(30) Foreign Application Priority Data

Apr. 19, 2021 (SG) ........................... 10202103967Y

(51) Int. Cl.
*G05D 1/00* (2024.01)
*B64U 50/23* (2023.01)
(Continued)

(52) U.S. Cl.
CPC ............ *G05D 1/689* (2024.01); *B64U 50/23* (2023.01); *B64U 50/30* (2023.01); *G05D 1/248* (2024.01);
(Continued)

(58) Field of Classification Search
CPC .......... G05D 1/689; G05D 1/248; G05D 1/65; G05D 2109/20; G05D 2111/10;
(Continued)

(56) References Cited

U.S. PATENT DOCUMENTS

2017/0124883 A1 5/2017 Modica et al.
2017/0349279 A1 12/2017 Garcia-gabin et al.
(Continued)

FOREIGN PATENT DOCUMENTS

CN 108390645 A 8/2018
CN 108830311 A 11/2018
(Continued)

OTHER PUBLICATIONS

CN-108919821-A, Yang Translation (Year: 2018).*
(Continued)

*Primary Examiner* — Aniss Chad
*Assistant Examiner* — Hussam Aldeen Alzateemeh
(74) *Attorney, Agent, or Firm* — Botos Churchill IP Law LLP

(57) ABSTRACT

An aspect of the present disclosure relates to automated imaging of photovoltaic devices using an aerial vehicle (20). In one aspect, there is a method (440) for automated imaging of a PV array (310) using an aerial vehicle (20), the PV array (310) corresponding to target points (350) for the aerial vehicle (20). The method (440) comprises: positioning the aerial vehicle (20) at one of the target points (350) corresponding to the PV array (310); and controlling the aerial vehicle (20) for automated manoeuvre between the target
(Continued)

points (350) to capture visual datasets of the PV array (310). The automated manoeuvre comprises: aligning a field-of-view (225) of a camera (222) of the aerial vehicle (20) to a PV array subsection of the PV array (310); determining a scanning direction (360) for moving the aerial vehicle (20) between the target points (350); and capturing, using the camera (222), the visual datasets of the PV array (310) starting from the PV array subsection as the aerial vehicle (20) moves along the scanning direction (360) between the target points (350).

28 Claims, 22 Drawing Sheets

(51) Int. Cl.

| | |
|---|---|
| ***B64U 50/30*** | (2023.01) |
| ***G05D 1/248*** | (2024.01) |
| ***G05D 1/65*** | (2024.01) |
| ***G05D 1/689*** | (2024.01) |
| ***G06V 20/17*** | (2022.01) |
| *B64U 101/30* | (2023.01) |
| *G05D 109/20* | (2024.01) |
| *G05D 111/10* | (2024.01) |

(52) U.S. Cl.
CPC ............... *G05D 1/65* (2024.01); *G06V 20/17* (2022.01); *B64U 2101/30* (2023.01); *B64U 2201/20* (2023.01); *G05D 2109/20* (2024.01); *G05D 2111/10* (2024.01)

(58) Field of Classification Search
CPC ........... G05D 2105/89; G05D 2107/75; G05D 2109/254; B64U 50/23; B64U 50/30; B64U 2101/30; B64U 2201/20; B64U 2101/26; B64U 2101/31; G06V 20/17; H02S 50/15
USPC ............................................................. 701/3
See application file for complete search history.

(56) References Cited

U.S. PATENT DOCUMENTS

| | | | | |
|---|---|---|---|---|
| 2019/0161186 | A1 | 5/2019 | Chen et al. | |
| 2020/0349723 | A1* | 11/2020 | Geva | G06V 20/56 |
| 2021/0126582 | A1* | 4/2021 | Shue | G01M 5/005 |

FOREIGN PATENT DOCUMENTS

| | | | | |
|---|---|---|---|---|
| CN | 108919821 | A | 11/2018 | |
| CN | 109002048 | A * | 12/2018 | G05D 1/0808 |
| CN | 110244766 | A | 9/2019 | |
| CN | 110277962 | A | 9/2019 | |
| CN | 111738931 | A | 10/2020 | |
| CN | 111770880 | A | 10/2020 | |
| CN | 111930138 | A | 11/2020 | |
| JP | 2016197980 | A | 11/2016 | |
| JP | 2020112499 | A | 7/2020 | |
| KR | 20160048276 | A | 5/2016 | |
| KR | 101660456 | B1 | 9/2016 | |
| WO | 2019144317 | A1 | 8/2019 | |

OTHER PUBLICATIONS

CN-109002048-A, Yang Translation (Year: 2018).*
International Preliminary Report of Patentability issued in corresponding International Application No. PCT/SG2022/050071, mailed Jul. 18, 2023, 17 pages.
International Search Report and Written Opinion issued in corresponding International Patent Application No. PCT/SG2022/050071, mailed May 19, 2022, 13 pages.
The Extended European Search Report for European Patent Application No. 22792108.7, May 23, 2025, 7 Pages.
Office Action for Japanese Patent Application No. 2023-564003, Feb. 3, 2026, 8 Pages.

* cited by examiner

| | H | I1 | I1’ | I2 | I2’ | I3 | I3’ | I4 | I4’ | I5 | I5’ | I6 | I6’ |
|---|---|---|---|---|---|---|---|---|---|---|---|---|---|
| H | | | | | | | | | | | | | |
| I1 | | | | | | | | | | | | | |
| I1’ | | | | | | | | | | | | | |
| I2 | | | | | | | | | | | | | |
| I2’ | | | | | | | | | | | | | |
| I3 | | | | | | | | | | | | | |
| I3’ | | | | | | | | | | | | | |
| I4 | | | | | | | | | | | | | |
| I4’ | | | | | | | | | | | | | |
| I5 | | | | | | | | | | | | | |
| I5’ | | | | | | | | | | | | | |
| I6 | | | | | | | | | | | | | |
| I6’ | | | | | | | | | | | | | |

AUTOMATED IMAGING OF PHOTOVOLTAIC DEVICES USING AN AERIAL VEHICLE AND AUTOMATED FLIGHT OF THE AERIAL VEHICLE FOR PERFORMING THE SAME

CROSS REFERENCE TO RELATED APPLICATION(S)

The present application is a national phase entry under 35 U.S.C. § 371 of International Application No. PCT/SG2022/050071, filed Feb. 17, 2022, published in English, which claims the benefit of the filing date of Singapore Patent Application No. 10202103967Y, filed Apr. 19, 2021, the disclosures of which are incorporated herein by reference.

TECHNICAL FIELD

The present disclosure generally relates to automated imaging of photovoltaic (PV) devices using an aerial vehicle and automated flight of the aerial vehicle for performing the same. More specifically, the present disclosure describes various embodiments of the aerial vehicle and methods for automated imaging of PV devices and automated flight of the aerial vehicle for performing the imaging of the PV devices.

BACKGROUND

Solar panels have found widespread use globally. However, due to high initial capital investment cost, solar panels installed in the field must work properly and efficiently for a period of time to ensure return on investment. Hence, it is important to maintain the quality of solar panels installed in the field. Due to the mass deployment of solar panels in solar farms (or generally photovoltaic (PV) installations), and the remote deployment of solar panels such as on the roof of houses, it is often difficult to monitor the performance of individual solar panels. Various imaging technologies such as visual, thermal (infrared), ultra-violet (UV) fluorescence, photoluminescence (PL) and electroluminescence (EL) imaging are available to detect defects of solar panels. For example, EL inspection is used during PV manufacturing for quality control.

For EL measurements, PV modules are connected to a power supply and put under forward bias. The emitted near-infrared light is captured with a camera that is sensitive in the near-infrared waveband. Some of the common methods for EL measurements are using mobile trailers or stationary tripod-mounted cameras. However, these methods are time consuming and not feasible for large PV installations. PV installations have lifetimes often exceeding 25 years, and EL measurements might need to be performed multiple times during their lifetimes, especially during important milestones such as commissioning after construction, inspection before the liability or warranty period ends, as well as technical due diligence for asset transactions and insurance claims. EL measurement is a valuable tool to rate the performance and degradation of PV modules, but existing methods are time consuming and highly labour intensive.

Therefore, in order to address or alleviate at least one of the aforementioned problems and/or disadvantages, there is a need for an improved alternative.

SUMMARY

According to a first aspect of the present disclosure, there is an aerial vehicle and a method for automated imaging of a PV array using the aerial vehicle, the PV array corresponding to target points for the aerial vehicle. The aerial vehicle comprises a controller for performing the method comprising: positioning the aerial vehicle at one of the target points corresponding to the PV array; and controlling the aerial vehicle for automated manoeuvre between the target points to capture a visual dataset of the PV array. The automated manoeuvre comprises aligning a field-of-view of a camera of the aerial vehicle to a PV array subsection of the PV array; determining a scanning direction for moving the aerial vehicle between the target points; and capturing, using the camera, the visual dataset of the PV array starting from the PV array subsection as the aerial vehicle moves along the scanning direction between the target points.

According to a second aspect of the present disclosure, there is an aerial vehicle and a method for automated flight of the aerial vehicle to perform imaging of a set of PV arrays. The aerial vehicle comprises a controller for performing the method comprising: determining flight paths between target points for capturing visual datasets of the PV arrays, each PV array corresponding to one or more target points; controlling the aerial vehicle for automated flight along the flight paths to each of the target points; and controlling the aerial vehicle for automated manoeuvre at the respective one or more target points to capture the visual dataset of each PV array using a camera of the aerial vehicle.

According to a third aspect of the present disclosure, there is an aerial vehicle and a method for automated flight of an aerial vehicle and automated imaging of a set of PV arrays using the aerial vehicle. The aerial vehicle comprises a controller for performing the method comprising: determining flight paths between target points for capturing visual datasets of the PV arrays, each PV array corresponding to a pair of start and end target points; controlling the aerial vehicle for automated flight along the flight paths to respective start target points of the PV arrays; and controlling the aerial vehicle for automated manoeuvre between the respective start and end target points of each PV array to capture the visual dataset of the PV array using a camera of the aerial vehicle. The automated manoeuvre comprises: aligning a field-of-view of the camera to a PV array subsection of the PV array; determining a scanning direction for moving the aerial vehicle between the start and end target points; and capturing, using the camera, the visual dataset of the PV array starting from the PV array subsection as the aerial vehicle moves along the scanning direction between the start and end target points.

Aerial vehicles and methods for automated flight and automated imaging of PV arrays according to the present disclosure are thus disclosed herein. Various features, aspects, and advantages of the present disclosure will become more apparent from the following detailed description of the embodiments of the present disclosure, by way of non-limiting examples only, along with the accompanying drawings.

DETAILED DESCRIPTION

Figure 1:
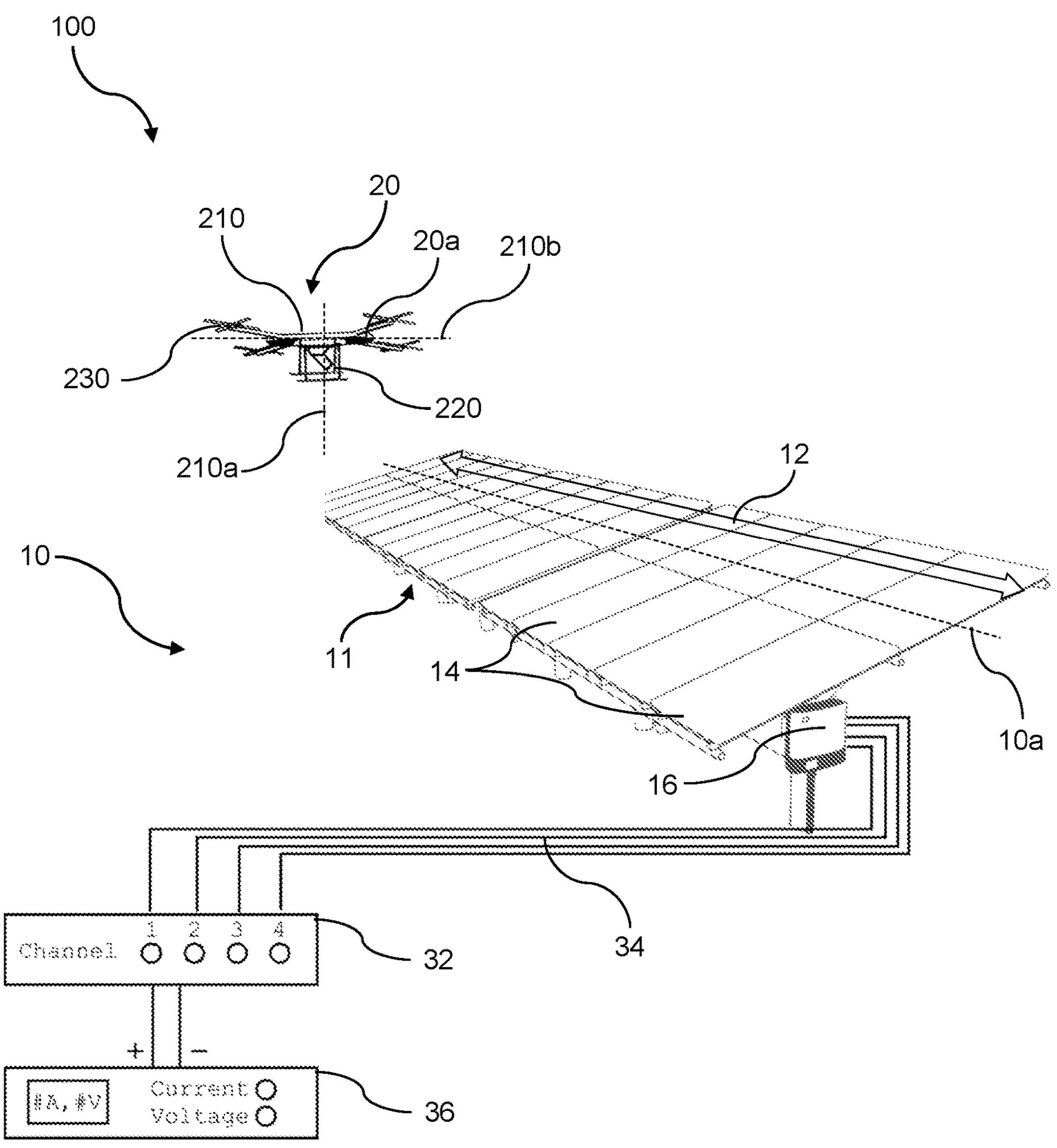
FIG. 1 is an exemplary setup for a UAV to capture visual datasets of PV arrays.

For purposes of brevity and clarity, descriptions of embodiments of the present disclosure are directed to aerial vehicles and methods for automated flight and automated imaging of PV arrays, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e., a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

In embodiments of the present disclosure, depiction of a given element or consideration or use of a particular element number in a particular figure or a reference thereto in corresponding descriptive material can encompass the same, an equivalent, or an analogous element or element number identified in another figure or descriptive material associated therewith.

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "a" and "an" are defined as one or more than one. The use of "/" in a figure or associated text is understood to mean "and/or" unless otherwise indicated. The term "set" is defined as a non-empty finite organization of elements that mathematically exhibits a cardinality of at least one (e.g. a set as defined herein can correspond to a unit, singlet, or single-element set, or a multiple-element set), in accordance with known mathematical definitions. The recitation of a particular numerical value or value range herein is understood to include or be a recitation of an approximate numerical value or value range.

FIG. 1 illustrates an exemplary inspection setup 100 for imaging and capturing visual datasets of a PV installation or system 10 installed on a roof of a building. The visual datasets can be processed to obtain processed images of the PV installation 10. An aerial vehicle (e.g. an unmanned aerial vehicle (UAV) 20) is deployed to capture visual datasets of the PV installation 10 for inspection. The UAV 20 includes a main body 210, a propulsion device 230 attached to the main body 210 to acuate movement of the UAV 20 including flight, and an optical sub-system 220 mounted to the main body 210 for capturing the visual datasets.

In the inspection setup 100, the imaging of the PV installation 10 includes electroluminescence (EL) measurements and the visual datasets include EL visual datasets. The PV installation 10 includes one or more PV arrays 11 and one or more PV strings 12 across the PV arrays 11. Each PV array 11 includes one or more PV devices or modules 14. One or more of the PV modules 14 are arranged in one or more of the PV strings 12. Each PV string 12 may extend across one or more PV arrays 11, and each PV array 11 may form part of one or more PV strings 12. In the embodiment as shown in FIG. 1, the PV installation 10 includes a number of PV arrays 11 and four PV strings 12. An exemplary PV array 11 is shown with a respective PV string 12 extending across the PV array 11. The PV array 11 includes two rows of several PV modules 14. The PV array 11 and PV string 12 are arranged along a longitudinal axis 10*a*. The PV strings 12 are connected to a combiner box 16 which combines the PV strings' 12 electrical output. The combiner box 16 is connected to an inverter which is then connected to the power grid. A larger PV installation 10 may include multiple combiner boxes 16 which are then connected to the inverter. Alternatively, the PV installation 10 may omit the combiner box 16 and the PV strings 12 are instead connected directly to the inverter. The inverter converts the combined electrical output from DC to AC before feeding the combined electrical output into the power grid. In this way, electricity generated by the PV modules 14 is fed into the power grid. During EL inspection, the PV strings 12 are disconnected from the power grid.

The setup 100 further includes a switcher box 32 that includes one or more channels 34. In the embodiment as shown in FIG. 1, the switcher box 32 includes three channels 34, and each PV string 12 of the PV installation 10 is connected to a respective channel 34 of the switcher box 32. The setup 100 further includes a power supply 36 connected to the switcher box 32. The setup 100 may optionally omit the switcher box 32 and the PV strings 12 can be directly connected to the power supply 36. The power supply 36 is configured to supply each PV string 12 with electricity, such as up to 1500 volts, and a minimum electrical current, such as equal to 10% of the short circuit current of the PV modules 14. Preferably, each PV string 12 is supplied with 100% of the short circuit current of the PV modules 14. However, this is not necessary. For example, each PV string 12 may be supplied with a current equal to 60% of the short circuit current of the PV modules 14. A measurement of the PV modules 14 at multiple electrical currents may be used to estimate electrical properties of the PV modules 14 and to identify current-dependent defects.

The channels 34 can be selectively activated, such as by an onsite worker or by remote control, to selectively supply the PV strings 12 with an electrical current from the power source 36 which puts the PV strings 12 under forward bias conditions. When put in the forward bias condition, one or more PV modules 14 in the PV string 12 emits light, otherwise known as electroluminescence (EL), and thus produces an EL signal that is detectable by the optical sub-system 220.

Additionally, it should be noted that multiple PV strings 12 may be connected to one channel 34. For example, all three PV strings 12 of the PV installation 10 may be connected to a single channel 34. In this scenario, all three PV strings 12 are simultaneously put under forward bias conditions, and the EL visual datasets of the entire PV installation 10 are captured. Notably, the amount of electrical current supplied by the power supply 36 is lower in this scenario compared to when each channel 34 is connected to respective PV strings 12 although this does not affect the PV strings 12 being put under forward bias conditions.

Figure 2A:
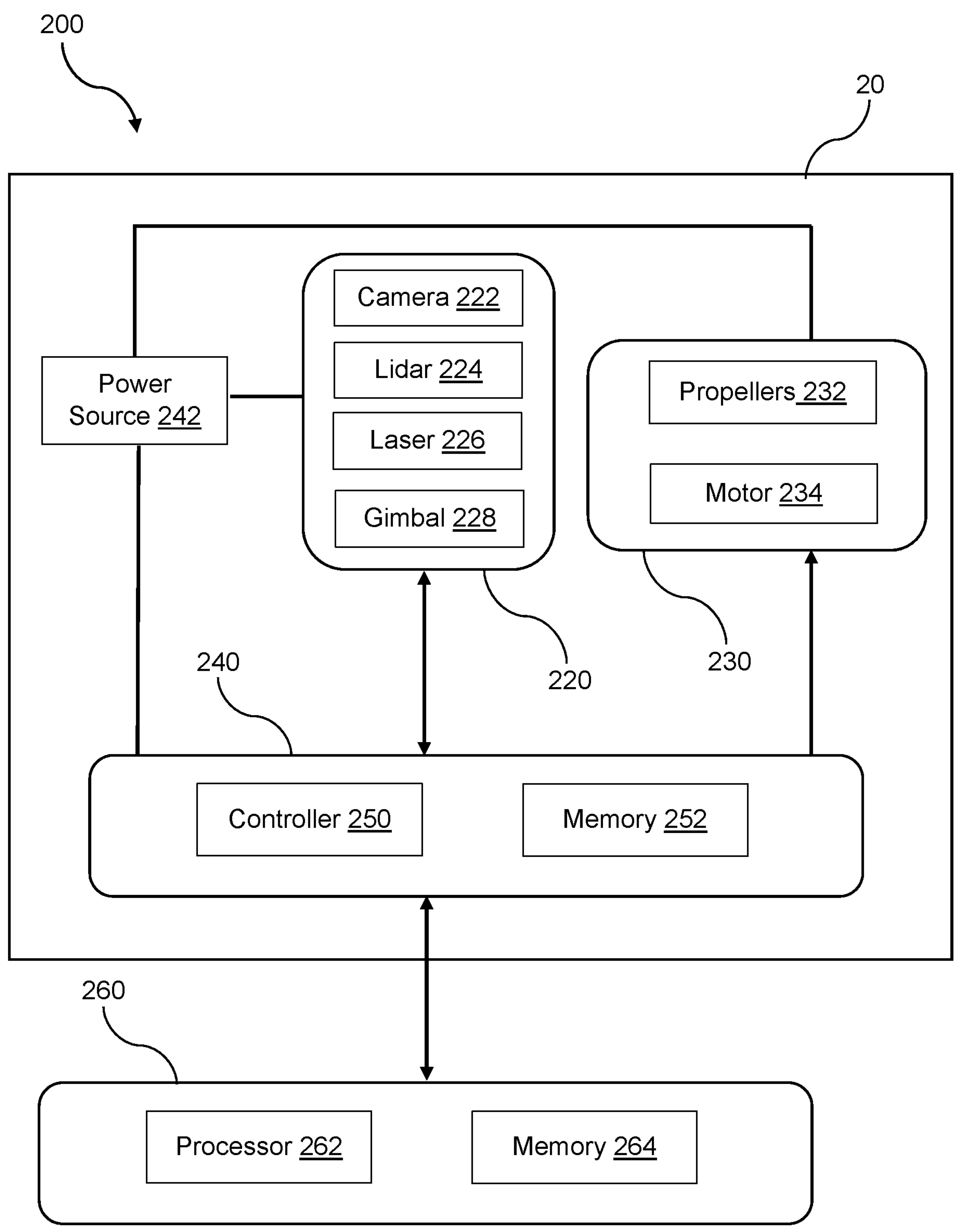
FIG. 2A is a block diagram illustrating a system architecture of a system for controlling the UAV to capture visual datasets.

FIG. 2A illustrates a system architecture 200 of a system 200 for controlling the UAV 20. The system 200 includes the UAV 20 and a remote device 260 communicative with the UAV 20. In addition to the optical sub-system 220 and propulsion device 230, the UAV 20 further includes an onboard processing sub-system 240 and a power source 242 (e.g. a set of batteries). The power source 242 is connected to, and powers, the optical sub-system 220, the propulsion device 230, and the onboard processing sub-system 240. The controller 250 is communicatively connected to and configured to control the optical sub-system 220 and propulsion device 230 to perform various functions.

Figure 2B:
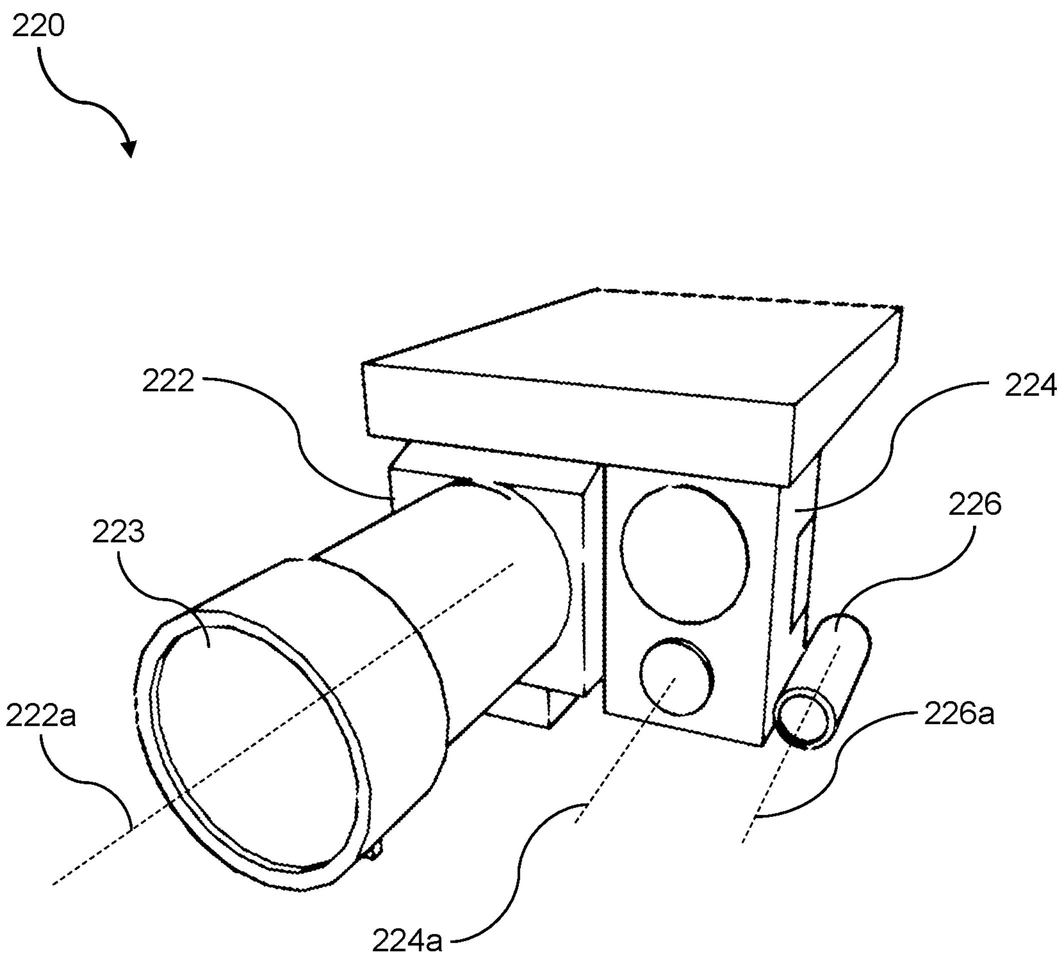
FIG. 2B is an optical sub-system of the UAV that includes a camera.

Further with reference to FIG. 2B, the optical sub-system 220 includes a camera 222 with an optical axis 222*a*. For example, the camera 222 is operable to capture monochromatic images and/or videos. The camera 222 is sensitive in the near- and/or short-infrared (NIR, SWIR) EL waveband, and is suitable for capturing EL visual datasets in such wavebands. The camera 222 includes a focusing lens 223 which is also suitable for use in the NIR/SWIR EL waveband. The lens 223 may include a motorized focus lens, voltage-controlled polymer lens, or liquid lens. The lens 223 allows the controller 250 to adjust the focus of the lens 223 depending on the distance of the lens 223 to a PV array 11. The focus of the lens 223 may be adjustable, either mechanically or electrically driven. The camera 222 may further include a lens filter for filtering out any unwanted spectrum of light.

The optical sub-system 220 further includes an optical distance measurement device such as a light detection and ranging (Lidar) device 224. The Lidar device 224 has an optical axis 224*a* that is aligned to the optical axis 222*a* of the camera 222. The Lidar device 224 is operable to measure distance of the optical sub-system 220 from the PV array 11.

The optical sub-system 220 further includes a focused light source such as a laser 226 or an LED. The laser 226 has an optical axis 226*a* that is also aligned to the optical axis 222*a* of the camera 222. The laser 226 is arranged to emit light in the visible spectrum, and has a beam divergence that is not larger than the camera's 222 field-of-view (FOV) which minimizes optical interference from the laser 226. Furthermore, the laser 226 allows for low power operation, emits light in a narrow waveband, and creates focused shapes which are easily identified. The focused shapes may be symmetrical or non-symmetrical. Non-symmetrical shapes advantageously allow for easier identification of where the camera 222 is pointing at, as well as to determine a rotation of the camera's FOV.

The optical sub-system 220 further includes a single-axis gimbal 228 which attaches the optical sub-system 220 to the main body 210 of the UAV 20. The controller 250 controls the gimbal 228 to raise/lower the optical axis 222*a* of the camera 222 with one degree of freedom (i.e. pitch angle). For example, the gimbal pitch may have an angular range of ±35° but is not limited to this. Alternatively, the optical sub-system 220 may be mounted to the main body 210 via a two-axis or a three-axis gimbal 228 to allow for further degrees of freedom (i.e. yaw and roll angles) for adjusting the optical axis 222*a* of the camera 222 and to provide enhanced stability of the FOV.

Referring to FIG. 2A, the propulsion device 230 of the UAV 20 includes four sets of propellers 232 driven by respective motors 234 to allow the UAV 20 to take flight and perform aerial manoeuvres, such as rotating about the aerial vehicle's yaw axis 210*a*. As shown in FIG. 1, the yaw axis 210*a* is a vertical axis that runs through a middle portion of the main body 210 when the UAV 20 is upright, and the roll axis 210*b* runs through the back and front 20*a* of the UAV 20. The pitch axis is perpendicular to the yaw axis 210*a* and roll axis 210*b*.

The onboard processing sub-system 240 includes a controller 250 and a memory unit 252. The controller 250 is configured to execute certain functions (as described further below) according to a set of instructions stored in the memory unit 252. The controller 250 receives information from the optical sub-system 220 including the distance from the PV array 11 to the Lidar device 224, as well as the camera's 222 visual feed. Using the information received from the optical sub-system 220, the controller 250 is configured to operate the optical sub-system 220 and propulsion device 230 to execute the functions. Once the EL visual datasets are captured, the UAV 20 may transmit the EL visual datasets to the remote device 260 or return to the home base 330 to transfer the EL visual datasets for further processing to obtain the processed EL images. The remote device 260 includes a processor 262 and a memory unit 264 storing instructions for executing a software application or mobile app to remotely control the UAV 20. For example, the remote device 260 is a computer, laptop, mobile phone, or tablet device.

There are various ways to control flight motion of the UAV 20, such as by controlling the motor speed of the propellers 232, UAV height or altitude, UAV speed, and UAV position. For example for UAV speed control, the UAV 20 receives commands containing speed vectors to fly at the defined speeds and directions. For example for UAV positional control, the UAV 20 receives commands containing GPS coordinates and flies to those coordinates. Similarly, the gimbal 228 can be controlled to adjust the pitch, yaw, and roll angles of the camera 222 by speed control (such as controlling gimbal pitch speed to adjust the pitch angle) or by positional control (such as directly controlling the pitch angular position).

In some embodiments, the controller 250 is configured to directly control flight control of the UAV 20 and manoeuvring of the camera 222, as well as for image processing of the visual feed captured by the camera 222, such as for aligning the camera 222 as described further below. In some other embodiments, the remote device 260 performs the flight control and image processing and sends commands to the controller 250 for the UAV 20 to execute those commands. The remote device 260 executes the software thereon and communicates directly with the UAV 20 for controlling the UAV 20. In some other embodiments, the remote device 260 communicates with a handheld remote controller, such as a joystick device, which then communicates with the UAV 20 for flight control. The UAV 20, remote device 260, and remote controller may communicate with each other via suitable wired or wireless communication protocols. Non-limiting examples of wireless communication protocols include Bluetooth, Wi-Fi, telecommunications network (such as 4G, 5G, and LTE), and peer-to-peer or server-based network. The remote device 260 can also be used to communicate with the channels 34 to selectively activate them and supply electrical current to the PV strings 12 and put them under forward bias conditions.

Figure 3A:
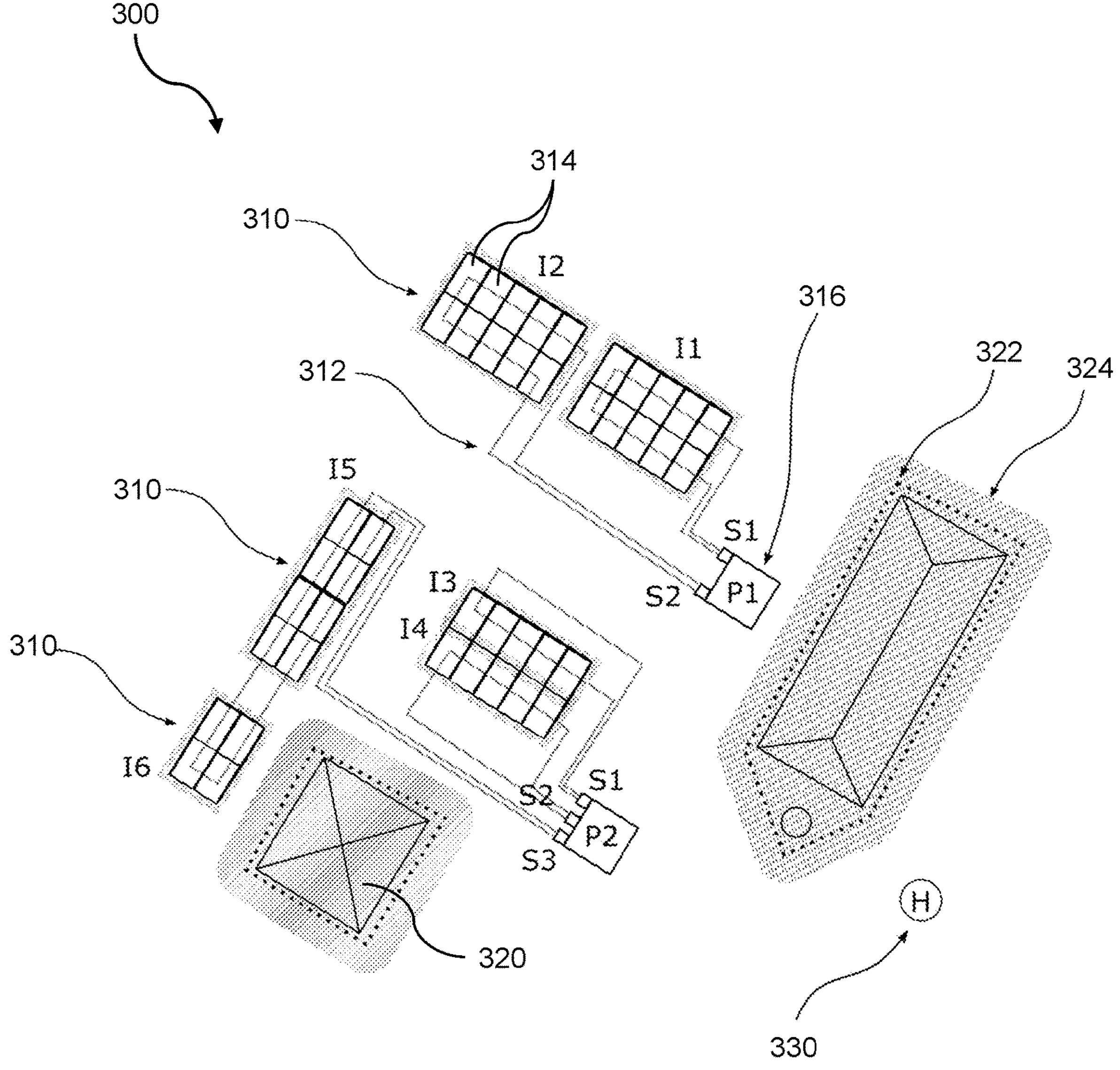
FIG. 3A is a plan view diagram of a PV installation comprising PV arrays.

In many embodiments, the UAV 20 is deployed to perform EL inspection of a PV installation 300 as shown in FIG. 3A, preferably performed at night or under low natural light conditions so that the electroluminescence can be more readily captured. The PV installation 300 has a number of PV arrays 310 to be measured and each is similar to the PV array 11 shown in FIG. 1. The PV installation 300 includes a number of PV strings 312 (S1,S2,S3) across the PV arrays 310 and connected to two connection points 316 (P1,P2). The connection points 316 can be inverters or combiner boxes or other structures connecting the PV strings 312. Each PV array 310 includes a multitude of PV devices or modules 314 connected in series along the respective PV string 312. The PV strings 312 can be aligned in a single PV array 310 or across multiple PV arrays 310.

The channels 34 can be selectively activated, such as by an onsite worker or by the remote device 260, to selectively supply the PV strings 312 with an electrical current which puts the PV strings 312 under forward bias conditions. For every PV array 310 and electrical current supplied to the respective PV strings 312, one EL visual dataset (I1 to I6) can be generated. The PV installation 310 further includes obstacles 320, such as buildings and trees, that must be avoided by the UAV 20 during flight. Each obstacle 320 may be defined with a boundary 322 and a safety margin 324 outside the boundary 322. The home base 330 marks the location where the UAV 20 usually starts and lands.

Figure 3B:
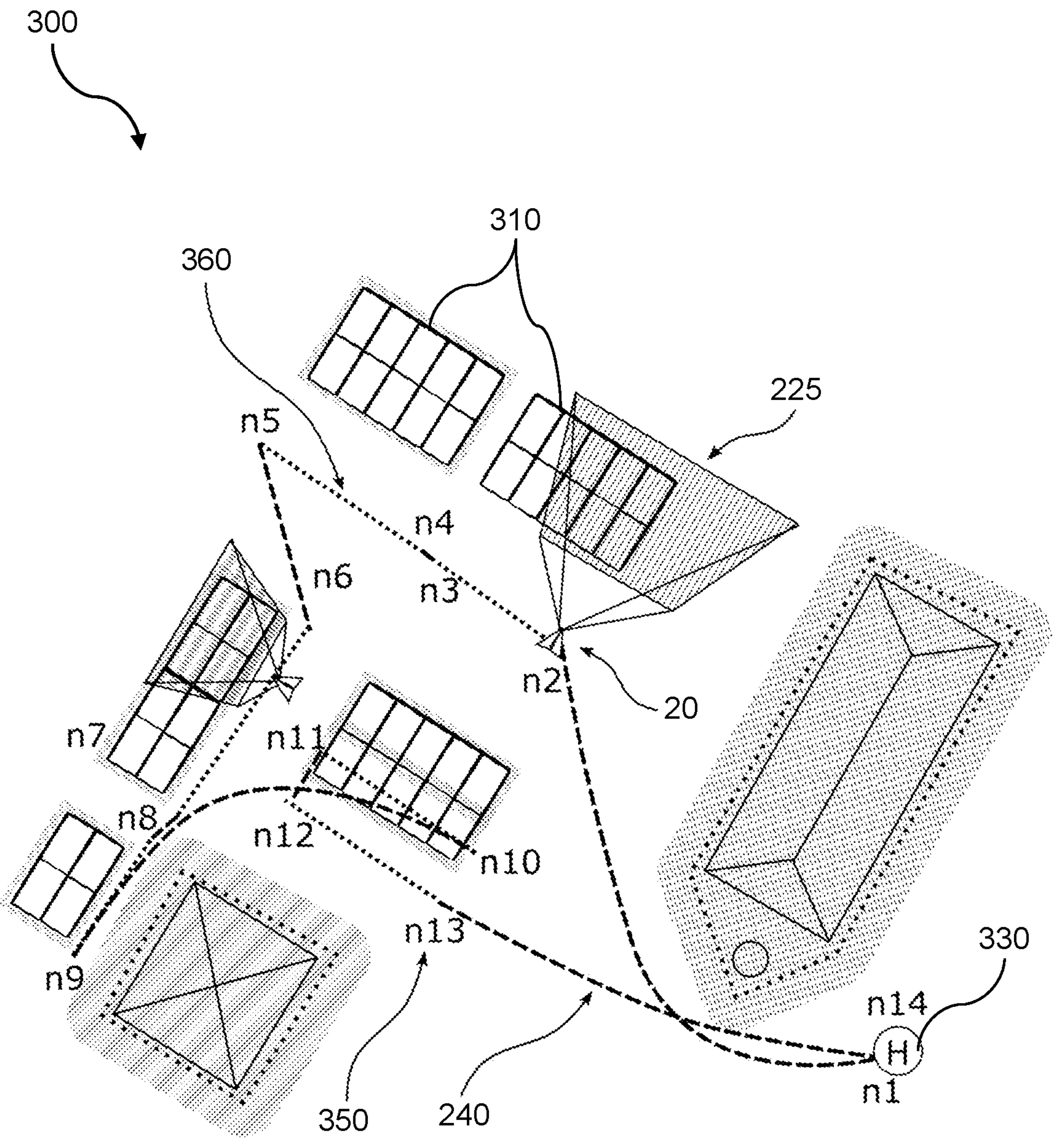
FIG. 3B is a plan view diagram of the PV installation showing flight paths to the PV arrays.

Further as shown in FIG. 3B, the UAV 20 flies along flight paths 340 over the PV installation 300 to capture EL visual datasets of the PV arrays 310. The flight paths 340 (shown in dashed lines) includes multiple waypoints (n1 to n14) starting from and ending at the home base 330. The flight paths 340 further include one or more target points 350 each corresponding to a PV array 310 for capturing EL visual datasets of the PV array 310. More specifically, when the UAV 20 is positioned at a target point 350, the camera 222 is facing the corresponding PV array 310, wherein a PV array sub-section of the PV array 310 is within the camera's field-of-view (FOV) 225. The UAV 20 moves along a scanning path 360 (shown in dotted lines) to capture EL visual datasets of one or more PV array sub-sections of the PV array 310 to thereby complete the EL visual datasets of the PV array 310. The UAV 20 then flies along the flight paths 340 to the next target point 350 to capture the EL visual datasets of the next PV array 310.

The UAV 20 is preferably configured with a flight plan detailing the flight paths 340 and target points 350 for automated flight along the flight paths 340 and for automated capturing of EL visual datasets of the PV arrays 310. More preferably, the pilot of the UAV 20 is able to remotely control the channels 34 to supply electrical current to the PV strings 312 without being on-site. However, it will be appreciated that the UAV 20 may still perform automated flight and automated capturing of the EL visual datasets in cooperation with a worker (or the pilot) manually controlling the channels 34.

Figure 4:
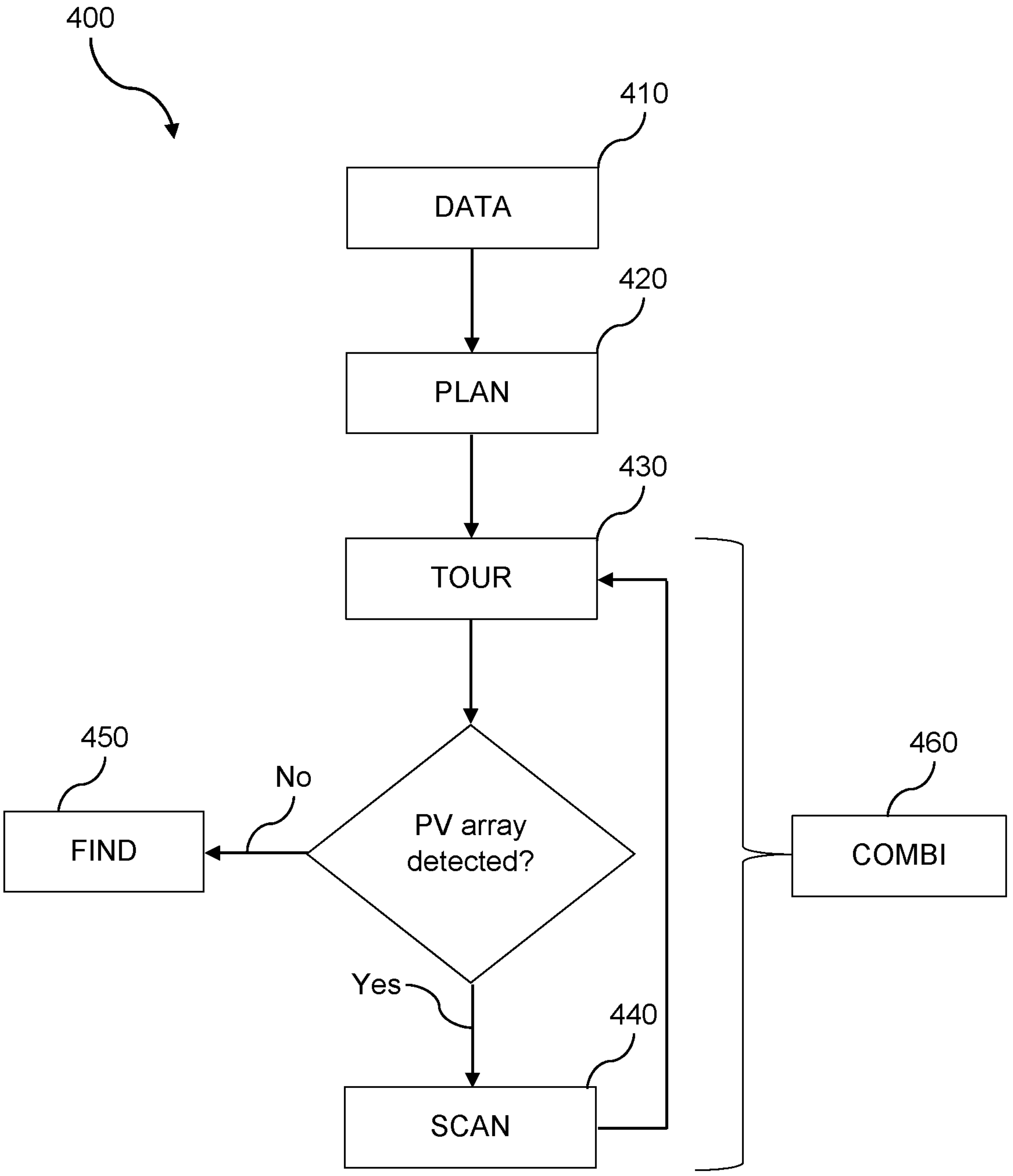
FIG. 4 is a flowchart of an exemplary process for automated flight of the UAV and for automated capturing of visual datasets.

FIG. 4 is a block diagram for an exemplary process 400 for automated flight of the UAV 20 over the PV installation 300 and for automated capturing of EL visual datasets of the PV arrays 310.

DATA Function

The process 400 includes a method 410 representing the DATA function. The DATA function determines the information required for the UAV 20 to image and capture visual datasets of the PV arrays 310. In many embodiments, the DATA function determines the information for EL measurements and capturing EL visual datasets of the PV arrays 310. The information determined in the DATA function can be shared among various EL measurement contractors, and missing/inaccurate information can be obtained from prior EL visual datasets, processed EL images, and/or on-site physical measurements at the PV installation 300. The information may be categorized into UAV information, image information, and obstacle information.

The UAV information includes location details to locate the home base 330 of the UAV 20. The location details may include latitude and longitude geographic coordinates. The UAV information also includes a safe height relative to the home base 330 that is safe for the UAV 20 to fly. The UAV information also includes a minimum distance between the UAV 20 and any obstacles 320 near the flight paths 340 to prevent collisions.

The image information includes details of EL visual datasets (e.g. I1 to I6) to be captured together with the corresponding PV strings 312 (S1 to S3), connection points 316 (P1,P2), and electrical currents to be supplied to the PV strings 312. For example and as shown in FIG. 1, EL visual dataset I1 corresponds to PV string S1 and connection point P1, and EL visual dataset 14 corresponds to PV string S2 and connection point P2. The image information further includes tilt angles, bearing angles, and heights of the PV arrays 310 to be measured. Depending on the geographic location of the PV installation 300, the PV arrays may not be aligned to the true horizontal to maximize exposure of the PV modules 314 to solar radiation. The tilt angle refers to the vertical inclination angle of the PV array 310 relative to the true horizontal plane. The bearing angle refers to the horizontal rotation angle of the PV array 310 relative to a reference direction on the true horizontal plane (such as the true north). The height refers to the vertical height difference between the PV array 310 and the home base 330.

The obstacle information includes location details, such as latitude and longitude geographic coordinates, of the boundaries 322 of obstacles 320 at the PV installation 300. In a 3D perspective, the boundary 322 of each obstacle 320 may be described using a prism model with a polygonal base. Obstacles 320 are objects in proximity of the flight paths 340 that must be avoided by the UAV 20 during measurement of the PV arrays 310. The obstacle information further includes the safety margin 324 for each obstacle 320 and the safety margins 324 may be dependent on the size of the obstacles 320. For example, a larger obstacle 320 would typically have a wider safety margin 324 to mitigate risk of collision with the UAV 20. The obstacle information further includes the height of each obstacle 320 relative to the home base 330. The obstacle heights can be obtained from technical drawings and/or measured using measurement devices such as a Lidar device. For example, the Lidar device 224 of the UAV 20 can be used for such purpose.

Figure 5:
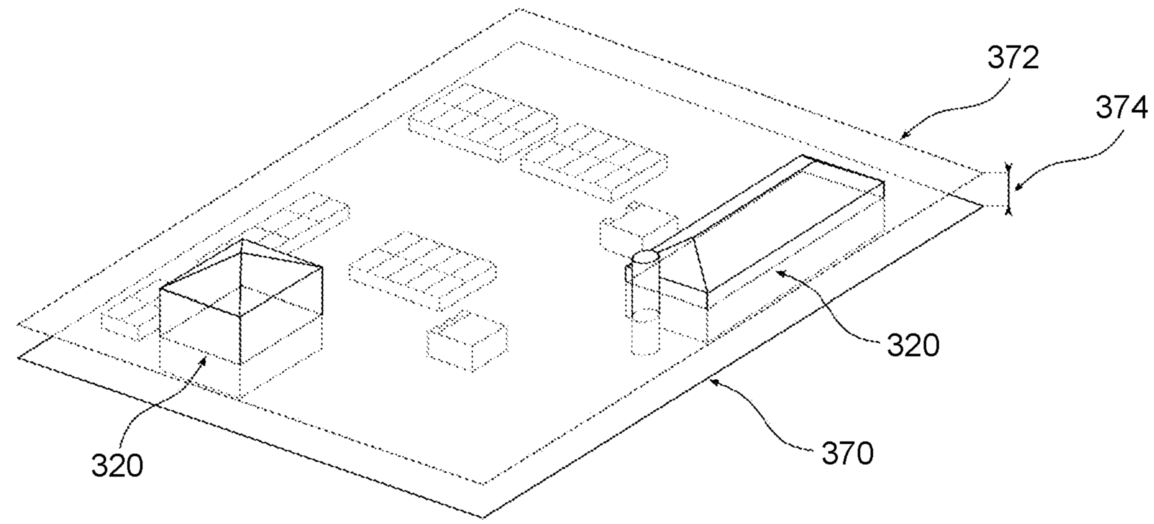
FIG. 5 is a perspective view diagram of a model of the PV installation to obtain obstacle outlines.

There are various ways of obtaining the boundaries 322 of the obstacles 320. For example as shown in FIG. 5, the PV installation 300 is modelled as a 3D digital surface model (DSM) 370 in perspective view. The DSM is intersected by a horizontal intersection plane 372 at an intersection height 374. This intersection height 374 is equal to the UAV safe height minus the UAV minimum distance described in the UAV information above. The result of this intersection is a set of polygons on the intersection plane 372 that can be used to describe the boundaries 322. Alternatively, the boundaries 322 can be described by manual or machine-guided tracing of image edges in a 2D orthomosaic map, wherein the image edges correspond to the boundaries 322. Yet alternatively, location coordinates of corners of the obstacles 320 can be measured using a GPS-enabled mobile device.

PLAN Function

The process 400 includes a method 420 representing the PLAN function. The PLAN function generates an imaging measurement plan for the UAV 20 to capture visual datasets of the PV arrays 310. In many embodiments, the PLAN function generates an EL measurement plan for EL measurements and capturing EL visual datasets of the PV arrays 310. The EL measurement plan includes location details of the target points 350 and flight manoeuvres to be executed by the UAV 20 to fly between the home base 330 and the target points 350 to capture EL visual datasets of the corresponding PV arrays 310. The process 400 further includes methods 430 and 440 describing the flight manoeuvres. Specifically, the method 430 represents the TOUR function for automated flight of the UAV 20 for EL measurement of the PV arrays 310, and the method 440 represents the SCAN function for automated EL measurement of each PV array 310. The TOUR and SCAN functions are described in more detail further below.

Figure 6:
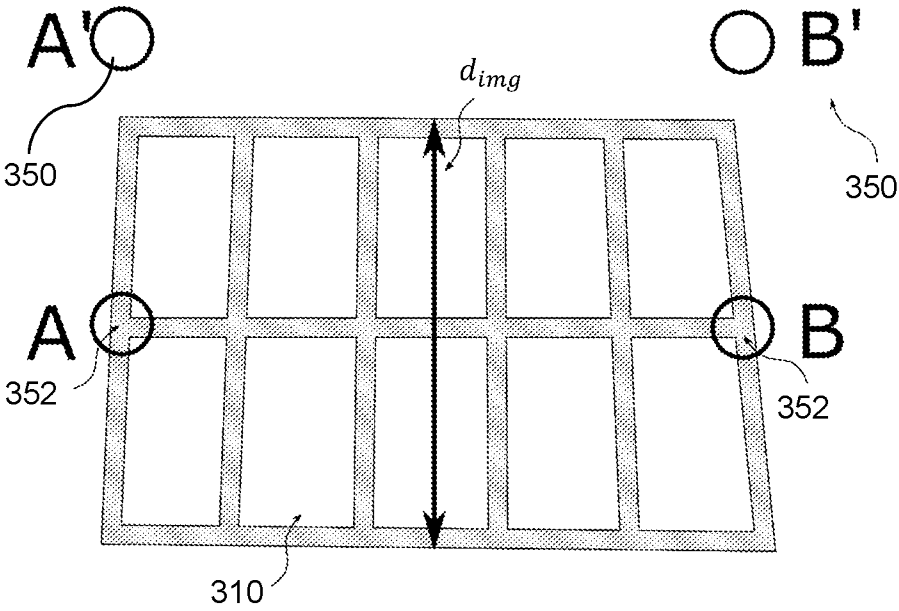
FIG. 6 is a plan view diagram of a PV array showing target points and target views.

In the EL measurement plan, each PV array 310 corresponds to one or more target points 350 for positioning the UAV 20 to capture the EL visual datasets of the PV array 310. In some embodiments as shown in FIG. 6, the PV array 310 corresponds to a pair of target points 350 (shown as A' and B'). The PV array 310 further includes side points 352 (shown as A and B) that correspond to the target points A' and B', respectively. When the UAV 20 is positioned at the target points A' and B', the camera 222 is aimed at the side points A and B, respectively, and the camera's optical axis 222*a* is aligned to the surface normal of the PV array 310. In many cases, the PV arrays 310 are rectangular and the UAV 20 will fly along the longer sides to capture the EL visual datasets. The target points A' and B' define the initial and final positions of the UAV 20, and the side points A and B define the target views of the camera 222 as the UAV 20 moves between the target points A' and B' during the EL measurement. The side points 352, which are along the longer sides of the PV array 310, can be obtained from the middle position of the shorter sides. By capturing the EL visual datasets of the PV array 310 while facing the side points or target views 352, the camera 222 is more likely to capture the edge of a PV array sub-section within the camera's FOV 225. This facilitates determination of the scanning path or direction 360 for moving the UAV 20 towards the opposite side, i.e. from A' to B' or vice versa, as will be described further below in relation to the SCAN function.

The EL measurement plan further includes the tilt angles, bearing angles, and heights of the PV arrays 310. The tilt angle ($\alpha_{tilt}$) and bearing angle ($\alpha_{bearing}$) can be translated into the pitch angle ($\alpha_{pitch}$) and yaw angle ($\alpha_{yaw}$), respectively, of the camera 222. If the camera 222 is forward-facing, i.e. facing the front 20*a* of the UAV 20, the yaw angle ($\alpha_{yaw}$) of the camera 222 can be set to be equal to the yaw angle of the UAV 20 around the yaw axis 210*a*. The pitch angle ($\alpha_{pitch}$) of the camera 222 is the angle between the camera's optical axis 222*a* and the true vertical. The pitch angle ($\alpha_{pitch}$) is positive if the camera 222 is facing the front 20*a* of the UAV 20 and negative if the camera 222 is facing the back of the UAV 20. The roll angle ($\alpha_{roll}$) of the camera 222 is assumed to be zero if the UAV 20 is aligned to the true horizontal plane.

Figure 7A:
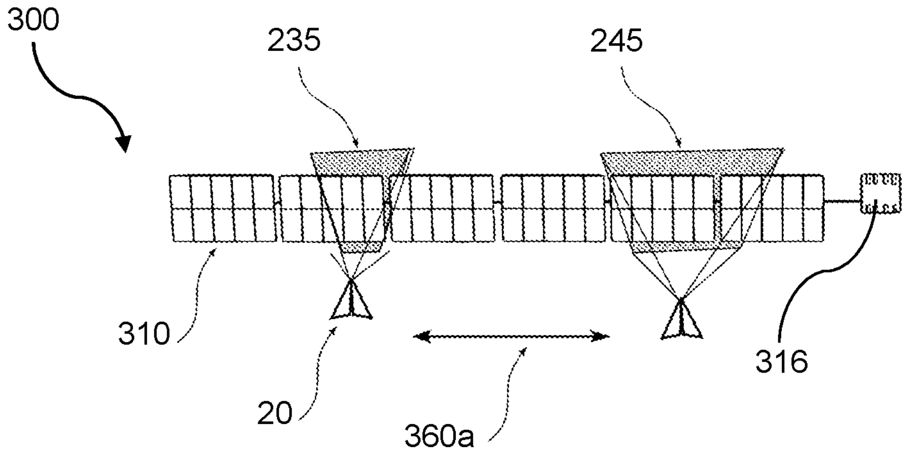
FIG. 7A is a plan view diagram of the PV array in front of the UAV, wherein the UAV moves along a sideward scanning direction.
Figure 7B:
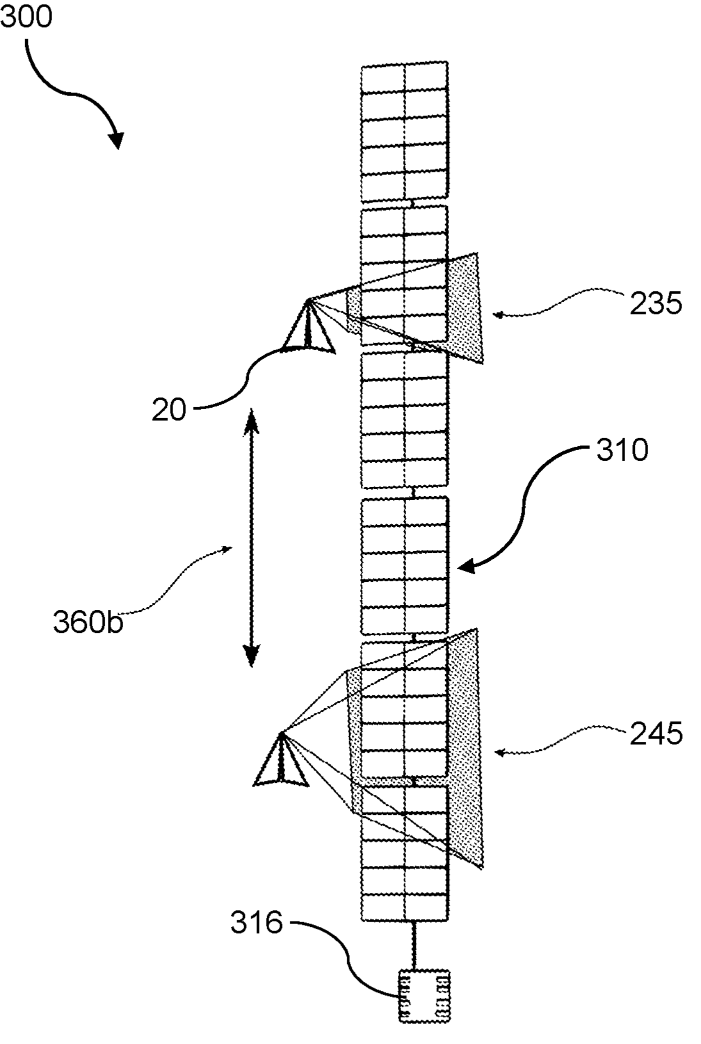
FIG. 7B is a plan view diagram of the PV array beside the UAV, wherein the UAV moves along a forward scanning direction.

There are two feasible scanning directions 360 for moving the UAV 20 along the array axis 10*a* to capture the EL visual datasets of the PV array 310. FIG. 7A shows the PV array 310 in front of the UAV 20 and the UAV 20 moves along a sideward scanning direction 360*a*. FIG. 7B shows a perpendicular alternative wherein the PV array 310 is beside the UAV 20 and the UAV 20 moves along a forward scanning direction 360*b*. The scanning direction 360 (sideward or forward) thus depends on the arrangement of the UAV 20, camera 222, and PV array 310.

For the sideward scanning direction 360*a* as shown in FIG. 7A, the UAV 20 and camera 222 are both facing forward, i.e. the camera 222 faces the front 20*a* of the UAV 20. the gimbal 228 can be used to adjust the pitch angle ($\alpha_{pitch}$) of the camera 222 to match the tilt angle ($\alpha_{tilt}$) of the PV array 310. The camera's yaw angle ($\alpha_{yaw}$) is equal to the bearing angle ($\alpha_{bearing}$) of the PV array 310. For optimal capturing of the EL visual datasets, with reference to FIG. 8, the camera's optical axis 222*a* should be perpendicular to the surface of the PV array 310. If the PV array 310 is not titled, i.e. $\alpha_{tilt}$=0, then the UAV 20 flies directly above the PV array 310 while the camera 222 is in the nadir position and the pitch angle is zero ($\alpha_{pitch}$=0). If the PV array 310 is tilted, the distance ($d_{xy}$) between the target points 350 and the target views 352 can be defined as below, where $d_L$ is the distance between the UAV 20 and the PV array 310 along the surface normal. Further, if the PV array 310 is shifted by the bearing angle ($\alpha_{bearing}$), the corresponding target points 350 of the PV array 310 would be shifted by a shift angle ($\alpha_{shift}$) in an opposite direction as the bearing angle ($\alpha_{bearing}$).

$$d_{xy} = d_L \cdot \sin(\alpha_{tilt})$$

$$\alpha_{shift} = \alpha_{bearing} + 180°$$

For the forward scanning direction 360*b* as shown in FIG. 7B, the UAV 20 and camera 222 are facing in perpendicular directions, i.e. the camera 222 faces sideways perpendicular to the front 20*a* of the UAV 20. If the gimbal 228 is a multi-axis one, the gimbal 228 can be used to adjust the roll angle ($\alpha_{roll}$) of the camera 222 to match the tilt angle ($\alpha_{tilt}$) of the PV array 310. Alternatively, the UAV 20 can manoeuvre its roll angle to adjust the roll angle ($\alpha_{roll}$) of the camera 222. As the camera 222 is perpendicular to the UAV 20, the camera's yaw angle ($\alpha_{yaw}$) is equal to a right angle plus the bearing angle ($\alpha_{bearing}$) of the PV array 310. Further, if the PV array 310 is shifted by the bearing angle ($\alpha_{bearing}$), the corresponding target points 350 of the PV array 310 would be shifted by the shift angle ($\alpha_{shift}$) in an opposite direction as the bearing angle ($\alpha_{bearing}$).

$$\alpha_{yaw} = \alpha_{bearing} + 90°$$

$$\alpha_{shift} = \alpha_{bearing} + 270°$$

In the same fashion as obstacles 320, PV arrays 310 are objects that the UAV 20 must avoid colliding with. The boundaries of the PV arrays 310 can be mapped in a similar manner as the obstacles 320. The height ($d_z$) of a PV array 310 relative to the home base 330 can be estimated during flight of the UAV 20 using the current flight height ($d_{baro}$) of the UAV 20 relative to the home base, the distance ($d_L$) between the UAV 20 and the PV array 310 along the surface normal, and the pitch angle ($\alpha_{pitch}$) of the camera 222, as defined below.

$$d_z = d_{baro} - [d_L \cdot \cos(\alpha_{pitch})]$$

Figure 9:
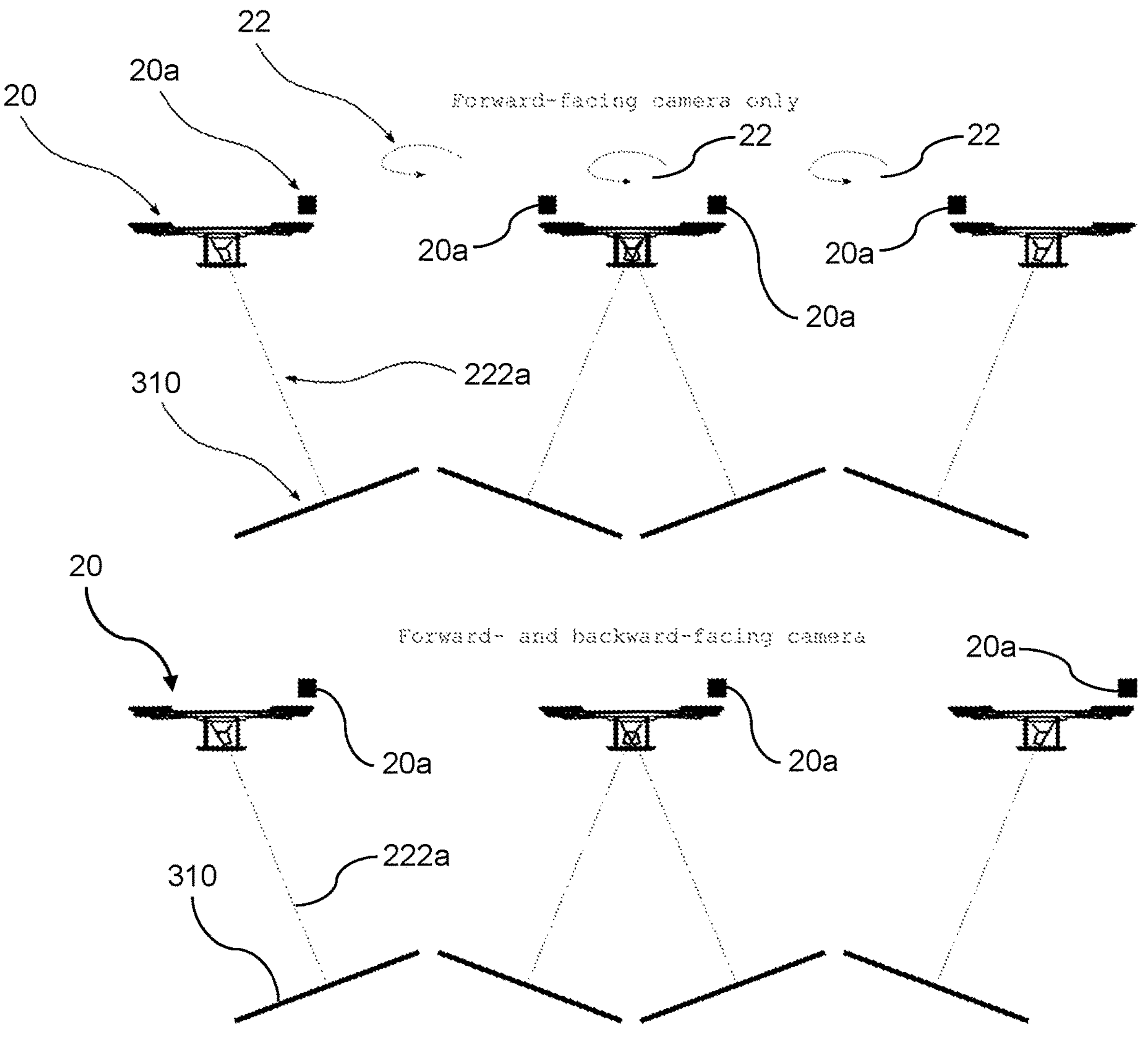
FIG. 9 is a side view diagram of multiple PV arrays tilted in different directions.

The camera 222 is normally facing forward in the same direction as the front 20*a* of the UAV 20. In certain geographical regions such as areas close to the Equator, PV arrays 310 can be tilted in different directions. The PV arrays 310 are differently tilted often not because to maximise exposure to solar radiation but to allow rainwater to flow away from the PV arrays 310. As shown in FIG. 9, these differently-tilted PV arrays 310 would require the forward-facing camera 222 to align to different pitch angles depending on the tilt angles of the PV arrays 310. The UAV 20 must be rotated 22 about the yaw axis 210*a* to change the pitch angles of the camera 222 according to the various tilt angles, which can be time consuming and possibly confusing to the pilot. To address this problem, in some embodiments, the gimbal 228 is configured to change the camera 222 between forward-facing and backward-facing, thereby changing its pitch angle without rotating 22 the UAV 20. In some other embodiments, the optical sub-system 220 of the UAV 20 may include two cameras 222—one forward-facing and the other backward-facing. Equivalent parameters for the backward-facing camera can be obtained from those for the default forward-facing camera as follows.

$$d'_{xy} = -d_{xy}$$

$$\alpha'_{pitch} = -\alpha_{pitch}$$

The image sensor of the camera 222 used for EL measurements commonly has aspect ratio different to one. For example, an image sensor with 640×512 pixels has an aspect ratio of 1.25. As shown in FIGS. 7A and 7B, the image sensor allows the camera's FOV 225 to capture EL visual datasets in portrait mode 235 or landscape mode 245. In portrait mode 235, a smaller but higher resolution subsection of the PV array 310 is captured in each EL visual dataset. In landscape mode 245, a larger but lower resolution subsection of the PV array 310 is captured in each EL visual dataset. The portrait mode 235 also allows the UAV 20 to fly at a lower height closer to the PV array 310 than the landscape mode 245 due to the smaller FOV 225. A PV array subsection refers to a portion of the PV array 310 that is captured by the image sensor at any one time. A PV array subsection can comprise one or more PV modules 314 or a portion thereof.

Figure 8:
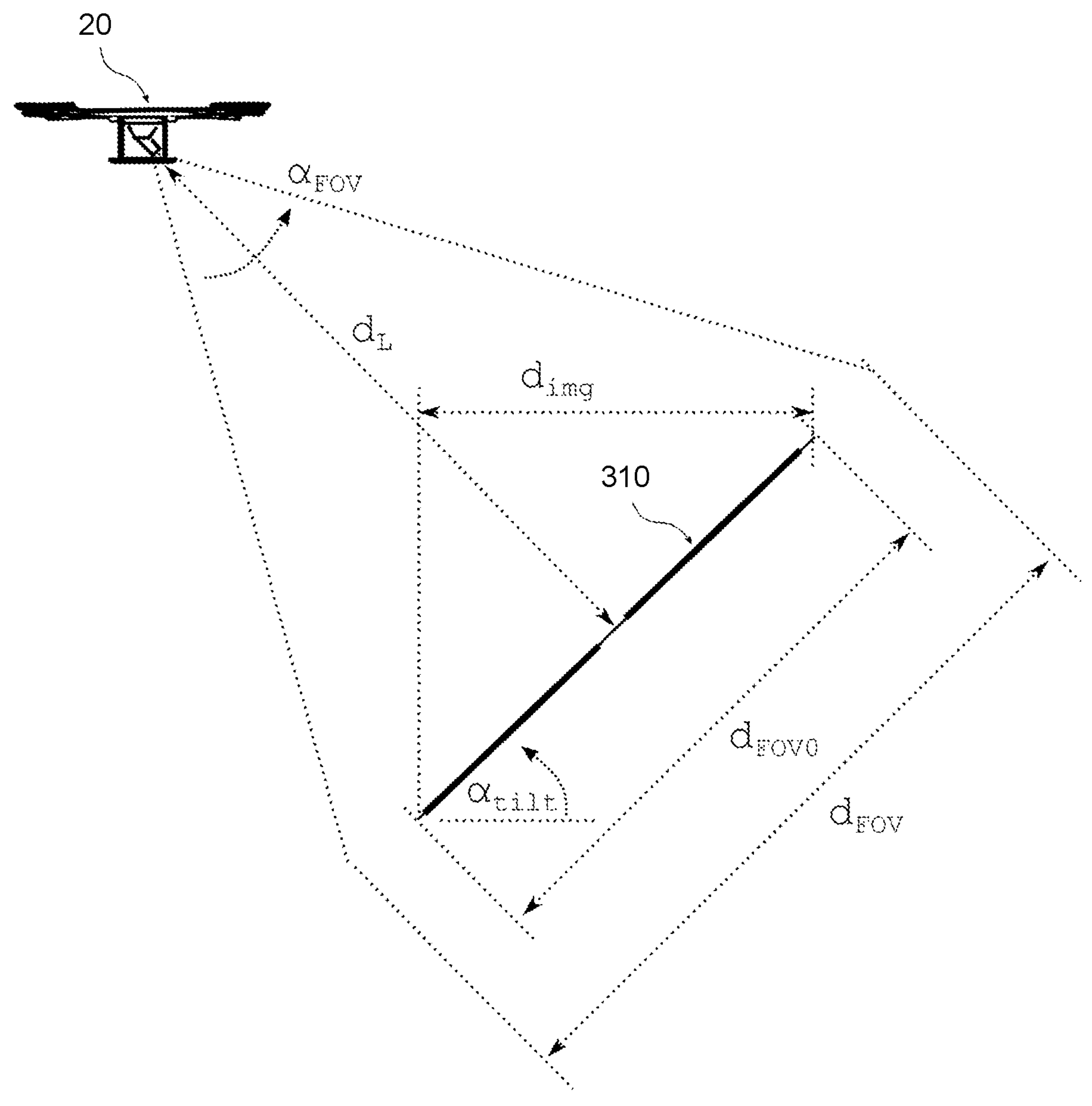
FIG. 8 is a side view diagram of the PV array and UAV to derive parameters for the UAV to scan the PV array.

As shown in FIGS. 6 and 8, the imaged distance ($d_{img}$), which is the distance between the longer sides of the PV array 310, represents the imaged distance of a nadir projection. The imaged distance within the camera's FOV 225 ($d_{FOV0}$) can be calculated as $$d_{FOV0} = \frac{d_{img}}{\cos(\alpha_{tilt})}$$

To ensure that the PV array subsection is fully captured in the image sensor such that the short side of the PV array subsection is fully within the camera's FOV 225, an additional space perpendicular to the scanning direction 360 is provided, resulting in an adjusted imaged distance ($d_{FOV}$). For example, a space factor ($f_{space}$) of 1.2 allows for an extra space of 10% on both sides.

$$d_{FOV} = d_{FOV0} \cdot f_{space}$$

With the angle of the camera's FOV 225 ($\alpha_{FOV}$) being perpendicular to the scanning direction 360, the distance ($d_L$) between the UAV 20 and the PV array 310 along the surface normal becomes $$d_L = \frac{d_{FOV}}{2\tan\left(\frac{\alpha_{FOV}}{2}\right)}$$

TOUR Function

The UAV 20 can be equipped with obstacle detection and collision avoidance devices, such as the Lidar device 224. These devices improve safety during operation as they can raise proximity alerts and stop the UAV 20 from moving towards a detected obstacle 320. However, such obstacle detection devices can be unreliable especially for translucent obstacles 320 such as glass structures and trees. EL measurements of PV arrays 310 are usually performed at heights of around 4-15 metres which are not above many buildings and trees, thus the risk of collision with these obstacles 320 is higher and it is important to mitigate this risk.

The process 400 includes the method 430 representing the TOUR function for automated flight of the UAV 20 for imaging of a set of PV arrays 310. In many embodiments, the TOUR function executes automated flight of the UAV 20 for EL measurements. The TOUR function executes automated flight manoeuvres between waypoints along the flight paths 340 while avoiding obstacles 320 along the flight paths 340 based on the EL measurement plan from the PLAN function. These waypoints include the target points 350 corresponding to the PV arrays 310 for measuring them, as well as the home base 330 for the UAV 20 to take off for the EL measurements and to land after capturing the EL visual datasets.

The TOUR function includes a step of determining the flight paths 340 between the target points 350 for capturing EL visual datasets of the PV arrays 310, each PV array 310 corresponding to one or more target points 350. Each target point 350 can be defined by its coordinates, height ($d_z$) of the corresponding PV array 310 relative to the home base 330, and the camera's yaw angle ($\alpha_{yaw}$) and pitch angle ($\alpha_{pitch}$). When the UAV 20 is positioned at a target point 350, the camera 222 is aimed to face the corresponding target view 352, such as the side point A and B mentioned above.

Figure 10:
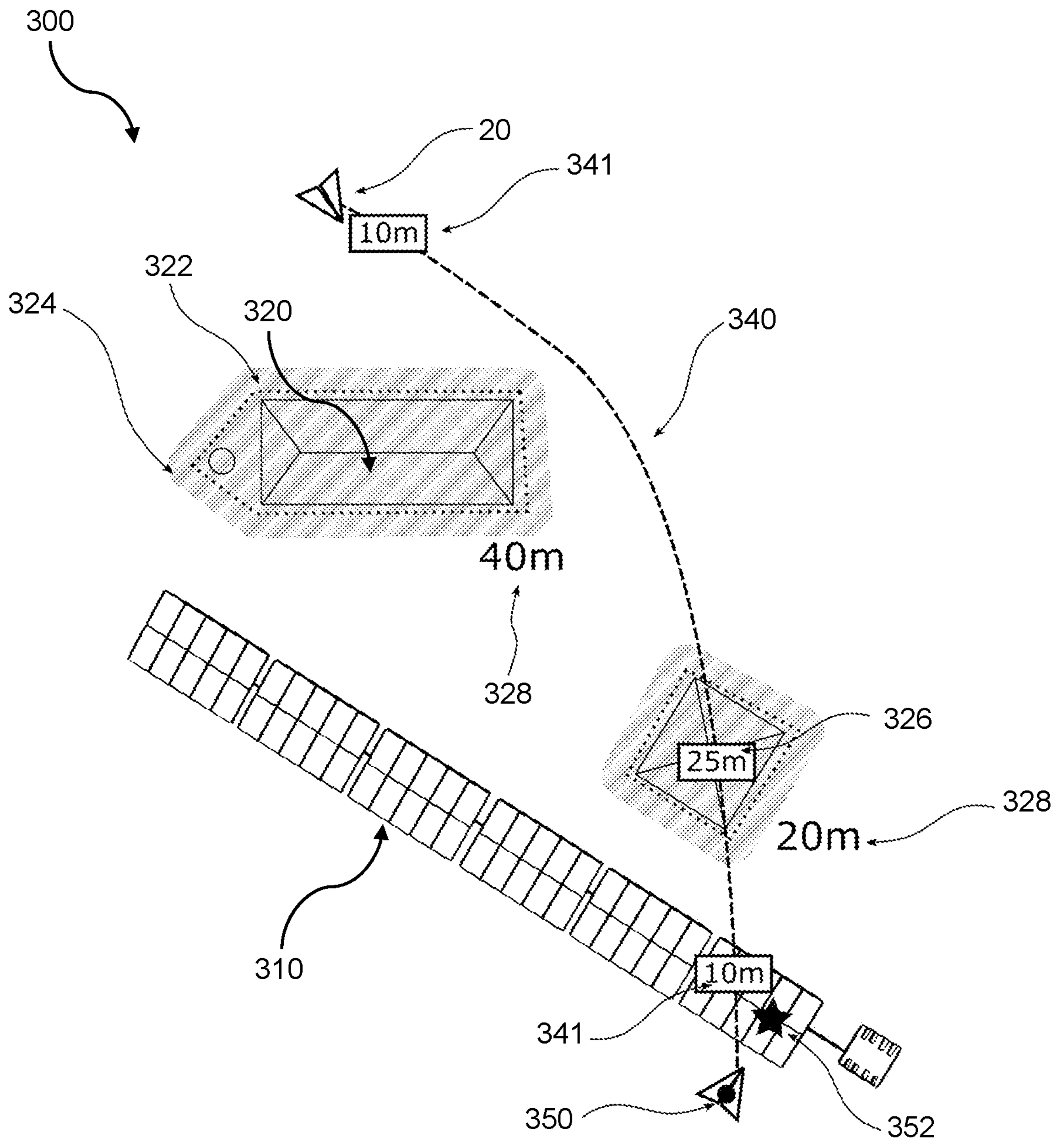
FIG. 10 is a plan view diagram of a flight path going around or above obstacles to the PV array.

Each flight path 340 (notably those shown in dashed lines in FIG. 3B) between the target points 350 is determined as the shortest route that avoid all known obstacles 320, such as by going around or above them. The flight path 340 can be calculated using a 3D spline function. The length of the flight path 340 is minimized by adjusting the positions of knots of the 3D spline function, wherein the flight path 340 does not intersect with any obstacle 320 and the flight path 340 is above a predefined minimum height 341. For each flight path 340, the number of knots is iteratively increased until a valid flight path 340 that satisfies these conditions, i.e. the flight path 340 does not intersect with any obstacle 320 and is above the predefined minimum height 341, can be found. As shown in an example in FIG. 10, the shortest flight path 340 can be around or above 326 the obstacles 320. Optionally, to force the UAV 20 to go around an obstacle 320 instead of above it, the height 328 of the obstacle 320 can be arbitrarily changed to a much larger value than its actual height.

Alternatively, the flight path 340 can be calculated using a 2D spline function for a predefined constant height of the flight path 340, wherein the predefined constant height is above the predefined minimum height 341. The flight path 340 has a number of knots that are iteratively increased until a valid flight path 340 that does not intersect with any obstacle 320 can be found.

The TOUR function includes a step of controlling the UAV 20 for automated flight along the flight paths 340 to each of the target points 350. Since all the flight paths 340 between the target points 350 have been determined, such as using the 3D spline function to find the shortest flight paths 340, the UAV 20 can be controlled for automated flight along these flight paths 340 such that the automated flight minimizes the overall flight duration.

In the PV installation 300 as shown in FIG. 3B with several PV arrays 310 and corresponding target points 350, there are many permutations of the target points 350 to plan the flight paths 340. The UAV 20 is configured to capture the six EL visual datasets (I1 to I6) of the PV arrays 310. As the EL visual datasets scanned by the camera 222 from one target point 350 to the other is equivalent to a scan in the reverse direction, the EL visual datasets captured in the forward direction (such as from target points A' to B') is denoted as EL visual datasets (I1 to I6) and those captured in the reverse direction (such as from target points B' to A') are denoted as EL visual datasets (I1' to I6'). The flight paths 340 and flight durations between the home base 330, the target points 350 for capturing the forward EL visual datasets (I1 to I6), and the target points 350 for capturing the reverse EL visual datasets (I1' to I6') can be determined using the TOUR function.

Figure 11:
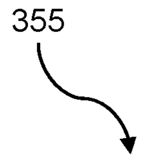
FIG. 11 is a triangular flight matrix for permutating flight paths between a home base and the target points.

As shown in FIG. 11, a triangular flight matrix 355 between these positions is calculated and shows the flight durations between the home base 330 and target points 350 (in both directions). The number of possible flight paths 340 is a permutation without repetition (n!) with sequences that are not mirrors of each other $$\left(\text{factor of } \frac{1}{2}\right).$$

Additionally, the camera 222 can scan the PV arrays 310 in the forward or reverse direction ($2^n$). With n being the number of EL visual datasets, i.e. n=6, then the total number (N) of possible flight paths 340 is then $$N = \frac{1}{2}(n! \cdot 2^n)$$

With n=6, then N=23040. There are 23040 permutations to scan the EL visual datasets (I1 to I6) of all the PV arrays 310. Using a computational algorithm such as brute force or k-nearest neighbour, an optimal flight sequence of the target points 350 can be determined. The target points 350 in the optimal flight sequence minimizes the overall flight duration of the flight paths 340, enabling the EL measurements to be completed more quickly.

Figure 12A:
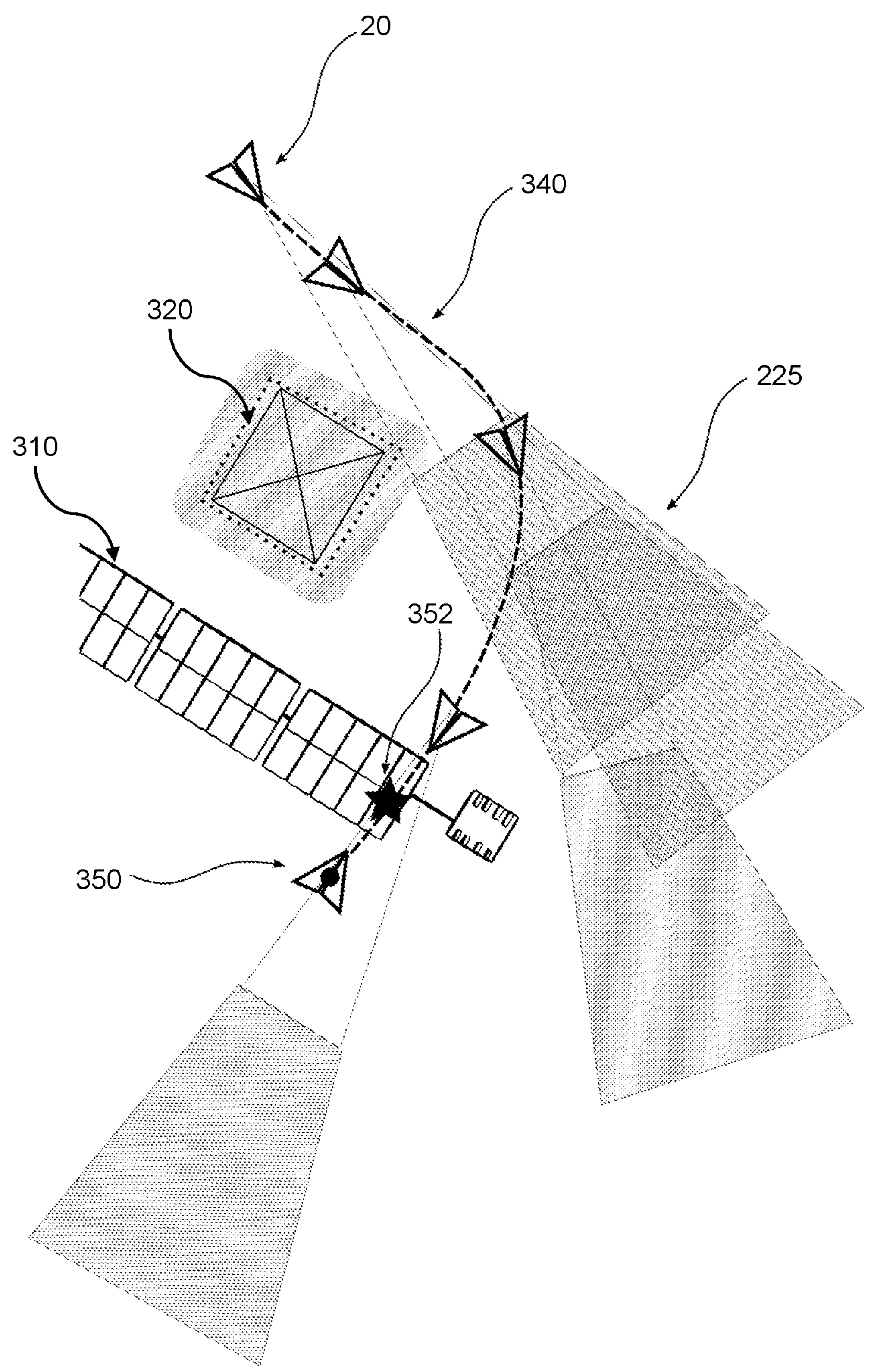
FIG. 12A is a plan view diagram of a flight path wherein the camera follows the flight path.
Figure 12B:
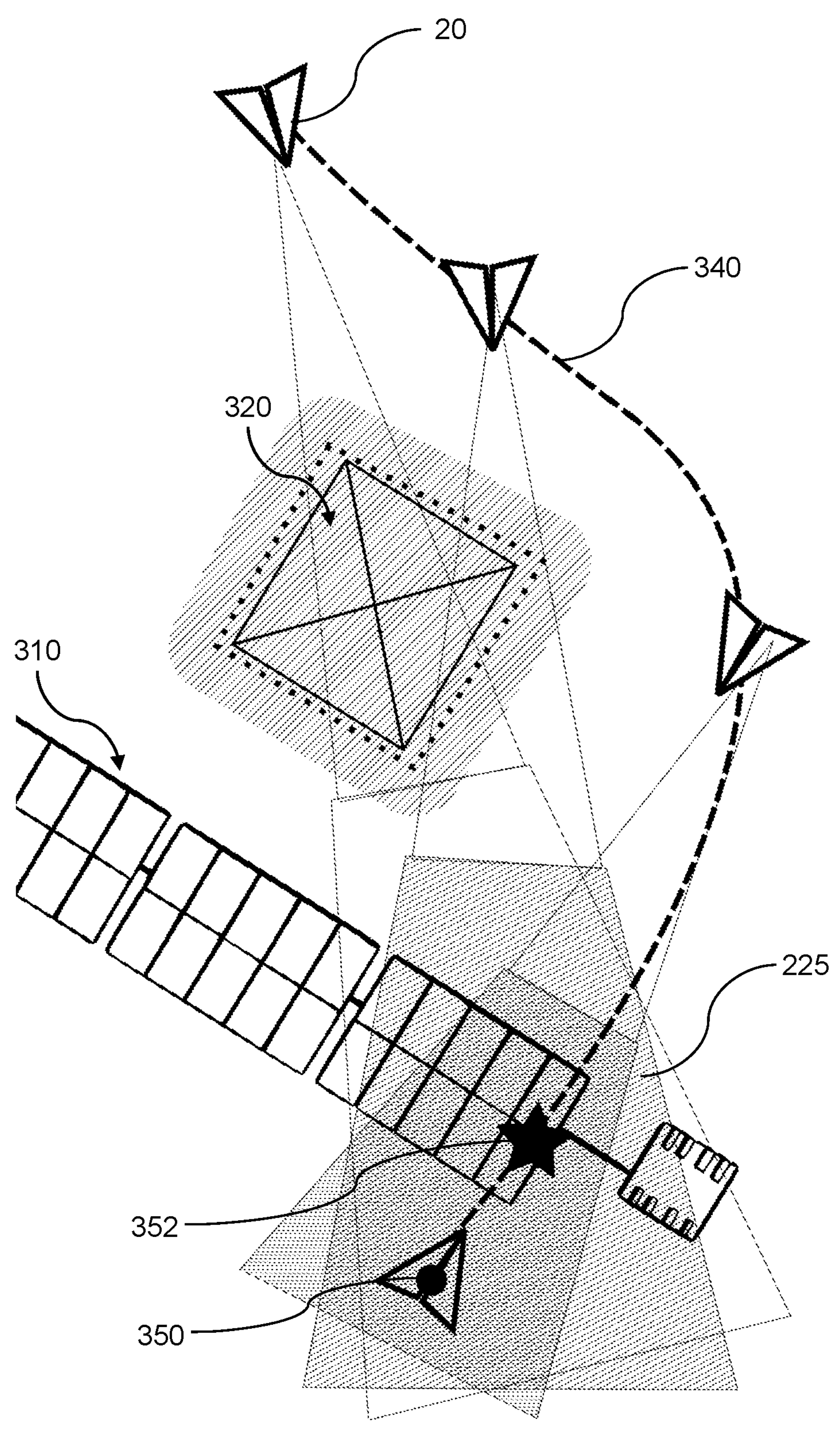
FIG. 12B is a plan view diagram of a flight path wherein the camera faces the target view corresponding to the next target point.

During automated flight along the flight paths 340, the camera 222 faces the front 20*a* of the UAV 20 such that the yaw angle ($\alpha_{yaw}$) of the camera 222 is the same as the yaw angle of the UAV 20. In one embodiment as shown in FIG. 12A, the orientation of the camera 222 is fixed and follows the flight paths 340. In one embodiment as shown in FIG. 12B, the camera 222 are oriented such that the camera 222 always faces the PV array 310 corresponding to the next target point 350 as the UAV 20 is flying to. More specifically, the camera 222 always faces the target view 352 corresponding to the next target point 350 as UAV 20 flies along the respective flight path 340 to the next target point 350, allowing the camera 222 to detect the EL signal from the PV array 310 early before arriving at the next target point 350. This supports navigation by the UAV's pilot and allows for early corrections of the flight path 340, if necessary, especially when flying at night or under low natural light conditions. To be able to detect the EL signal early, the UAV 20 should fly high enough above the PV arrays 310. The predefined minimum height 341 should thus be the maximum height 328 of the obstacles 320 along the flight path 340 plus the safety margin 324. The Lidar device 224 can measure the height of the UAV 20 relative to the roof of an obstacle 320. If the measured distance is within the safety margin 324, the UAV 20 should hover above the obstacle 320. If the measured distance is above the safety margin 324 and optionally below another larger value, an alert or warning message may be sent to the UAV pilot.

If the UAV pilot is at the home base 330 and the UAV 20 is flying towards the target points 350 away from the home base 330, the pilot and camera 222 will face the same general direction. If the UAV 20 is returning to the home base 330, the pilot and camera 222 will face opposite directions. The yaw angle of the UAV 20 may be rotated by 1800 so that the back of the UAV 20 faces the pilot and the pilot and camera 222 continue to face the same general direction. This configuration allows for more intuitive manual control of the UAV 20 by the pilot if necessary.

As the UAV 20 is flying towards a target point 350, the maximum flight speed depends on the current distance between the UAV 20 and the target point 350, as well as the gradient or curvature of the flight path 340. If the UAV is close to the target point 350 or within a predefined distance from the target point 350, the flight speed will be gradually reduced to avoid overshooting and missing the target point 350. If the gradient of the flight path 340 is too steep, the flight speed will also be reduced to avoid deviating from the flight path 340. The flight speed gradually reduces as the UAV 20 approaches the target point 350. The flight height also gradually lowers until it reaches a predefined minimum height 341 or the distance $d_L$ reaches a predefined value.

Figure 13:
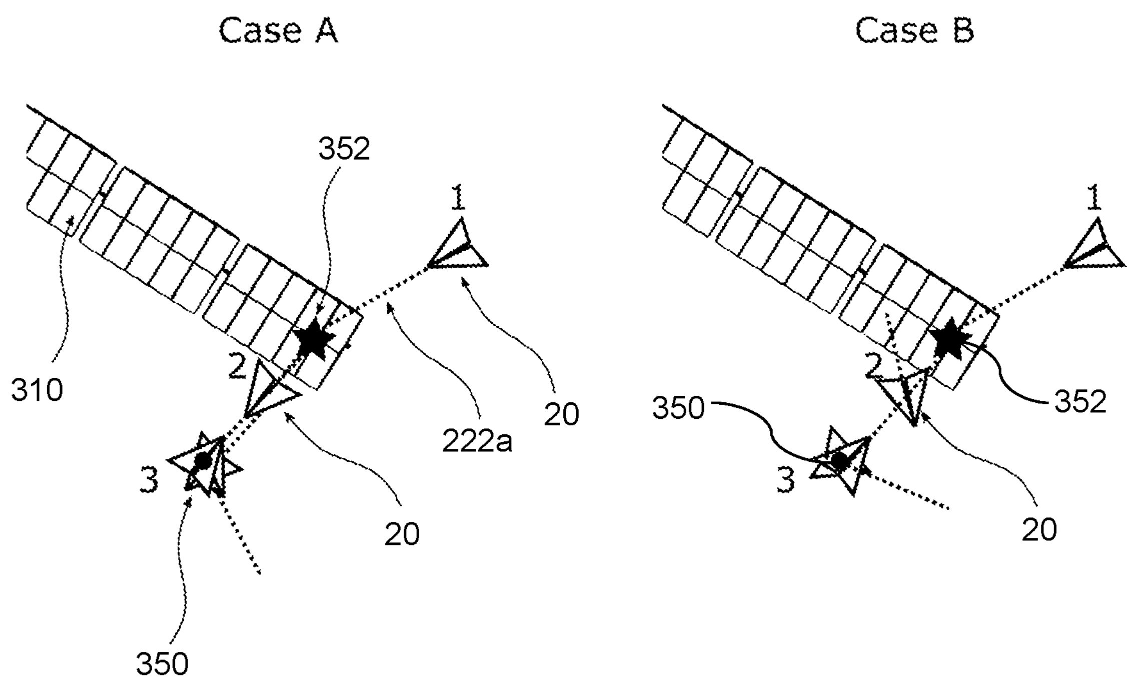
FIG. 13 is a plan view diagram of the UAV temporarily losing the target view as the UAV approaches the target point.

In the embodiment as shown in FIG. 12B, the camera 222 is oriented such that it always faces the target view 352 corresponding to the target point 350. However, in certain cases when the UAV 20 is approaching the target point 350, the camera 222 may not be able to always keep facing the target view 352. Two possible cases are illustrated in FIG. 13. In Case A, at position 1, the camera 222 is facing the target view 352. After flying over the target view 352 towards the target point 350, the camera's yaw angle ($\alpha_{yaw}$) changes only slightly. As such, at position 2, the originally forward-facing camera 222 now faces backwards away from the target view 352. The UAV 20 continues flying to the target point 350 and at position 3, the UAV 20 turns to allow the camera 222 to face forward at the target view 350. Thus, between positions 2 and 3, the camera 222 temporarily loses sight of the target view 352. To keep the camera 222 always facing the target view 352, the yaw angle of the UAV 20 would need to change very quickly when flying over the target view 352. However, as seen in Case B, the rate of changing the yaw angle of the UAV 20 is too slow to keep aligning the camera 222 with the target view 352. In both Cases A and B, the camera 222 loses view of the target view 352 for a short duration.

Figure 14:
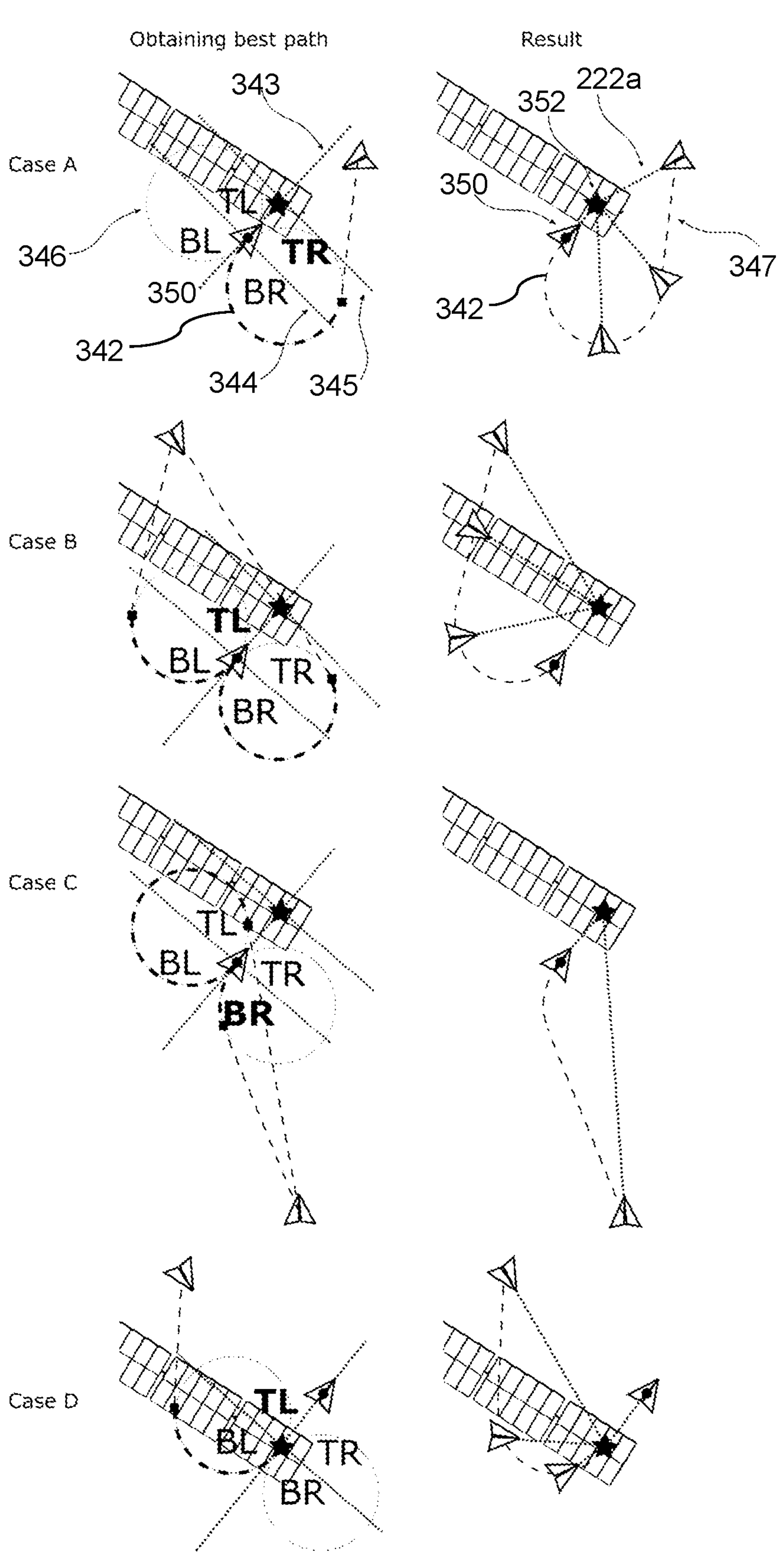
FIG. 14 is a plan view diagram for determining an orbiting path that circles around and towards the target point.

To address this problem of temporarily losing the target view 352, the flight path 340 to the target point 350 includes an orbiting path 342 that circles or orbits around and towards the target point 350. This allows the UAV 20, on automated flight along the orbiting path 342, to circle or orbit around the target point 350 as the UAV 20 approaches the target point 350. The orbiting path 342 may include a target turning circle tangential to the target point 350. The length of the orbiting path 342 or arc length of the target turning circle is determined by the angular difference between the yaw angles ($\alpha_{yaw}$) of the camera 222 before and at the target point 350. The radius of the target turning circle is determined by the rates of changing the camera's yaw angle ($\alpha_{yaw}$) and pitch angle ($\alpha_{pitch}$), as well as by the minimum turning radius of the UAV 20 at the flight speed when the UAV 20 enters the orbiting path 342. The algorithm to determine the orbiting path 342 is described below with reference to four Cases A to D as shown in FIG. 14.

i. Draw a first line 343 between the target point 350 and corresponding target view 352. As shown in Case A, the first line 343 aligns with the camera's yaw angle ($\alpha_{yaw}$) when the UAV 20 is positioned at the target point 350.

ii. Draw a second line 344 perpendicular to the first line 343 and through the target point 350.

iii. Draw a third line 345 perpendicular to the first line 343 and through the target view 352.

iv. Draw two target turning circles 346 tangential to and on both left and right sides of the first line 343. The centres of the target turning circles 346 intersect with the second line 344.

v. The sectors of the target turning circles 346 between the target point 350 and target view 352 are referred as top, and the other sectors are referred to as bottom. There are thus four zones created by the two target turning circles 346 and separated by the first line 343 and second line 344—top-left (TL), top-right (TR), bottom-left (BL), and bottom-right (BR) zones.

vi. The radius of the target turning circles 346 is determined such that the circumference is below the third line 345. If the circumference is above the third line 345, the target turning circles 346 must be shifted towards the bottom until they are tangential to the third line 345. This ensures that the camera 222 can continue to face forward to see the target view 352. In Case D, when the UAV 20 reaches the target point 350, the camera 222 changes from forward-facing to backward-facing in order to see the target view 352.

vii. For every UAV 20 position along the flight path 340, there are four tangents 347 intersecting with the UAV 20 and tangential with the target turning circles 346. The tangents 347 further away from the target point 350 are referred to as the outer tangents, and the tangents 347 closer to the target point 350 are referred to as the inner tangents.

viii. If the UAV 20 is in the TL zone as shown in Case B, the UAV 20 follows the outer tangent 347 of the left target turning circle 346. If the UAV 20 is in the TR zone, the UAV 20 follows the outer tangent 347 of the right target turning circle 346. If the UAV 20 is in the BR zone as shown in Case C, the UAV 20 follows the inner tangent 347 of the right target turning circle 346. If the UAV 20 is in the BL zone, the UAV 20 follows the inner tangent 347 of the left target turning circle 346.

ix. As shown on the right side of FIG. 14, in each of Cases A to C, the UAV 20 follows the respective tangent 347 and approaches the target point 350, while the camera 222 continues to face the target view 352. The UAV 20 continues along the tangent 347 until it touches the target turning circle 346. The UAV 20 then follows the arc of the target turning circle 346 until it reaches the target point 350 or the first line 343. If the UAV 20 reaches the first line 343 first, the UAV 20 continues along the first line 343 in a straight line until it reaches the target point 350.

Figure 15A:
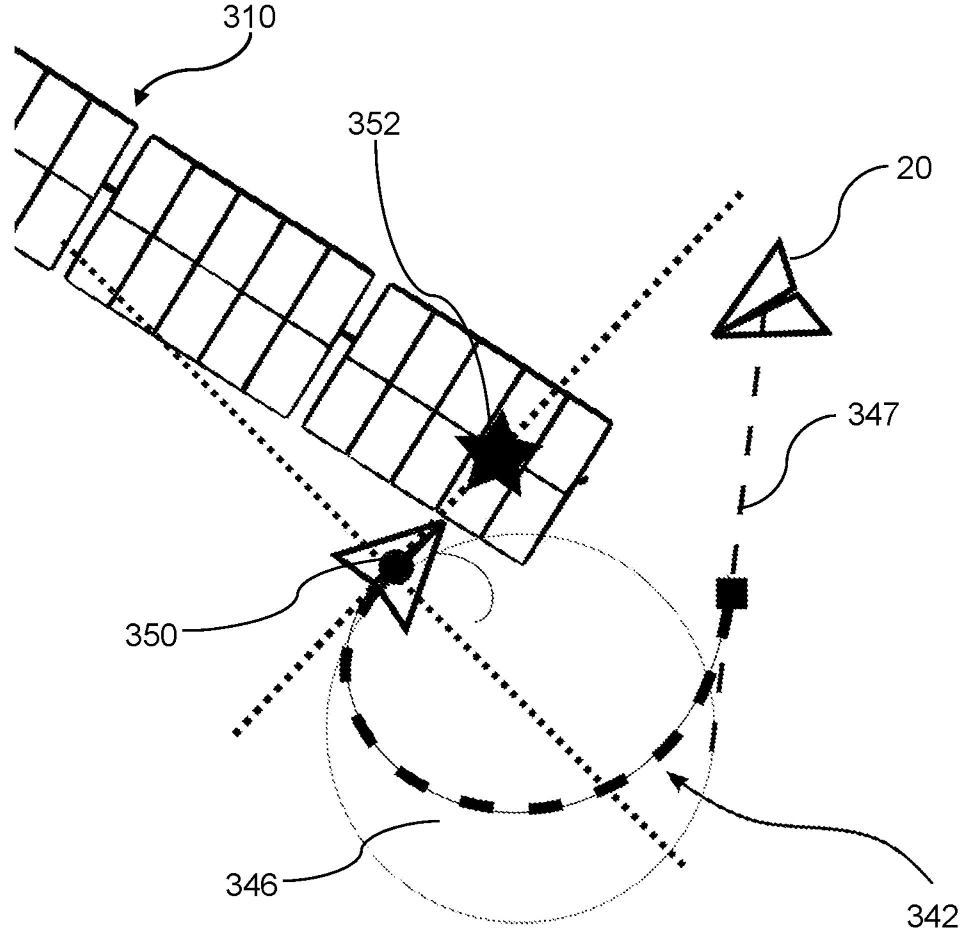
FIG. 15A is a plan view diagram of the orbiting path forming a shorter spiral path.

The rates of change of the yaw angle ($\alpha_{yaw}$) and pitch angle ($\alpha_{pitch}$) can be kept constant as the UAV 20 flies to the target point 350 along the orbiting path 342. As shown in FIG. 15A, the UAV 20 is in the TR zone and flies along the outer tangent 347 of the right target turning circle 346. As the flight speed gradually reduces as the UAV 20 approaches the target point 350, the constant rates would cause a larger yaw and pitch angular difference the closer the UAV 20 gets to the target point 350. This allows the radius of the target turning circles 346 to gradually decrease as the UAV 20 gets closer to the target point 350. This in turn results in the orbiting path 342 forming a shorter spiral path and a shorter flight duration.

Figure 15B:
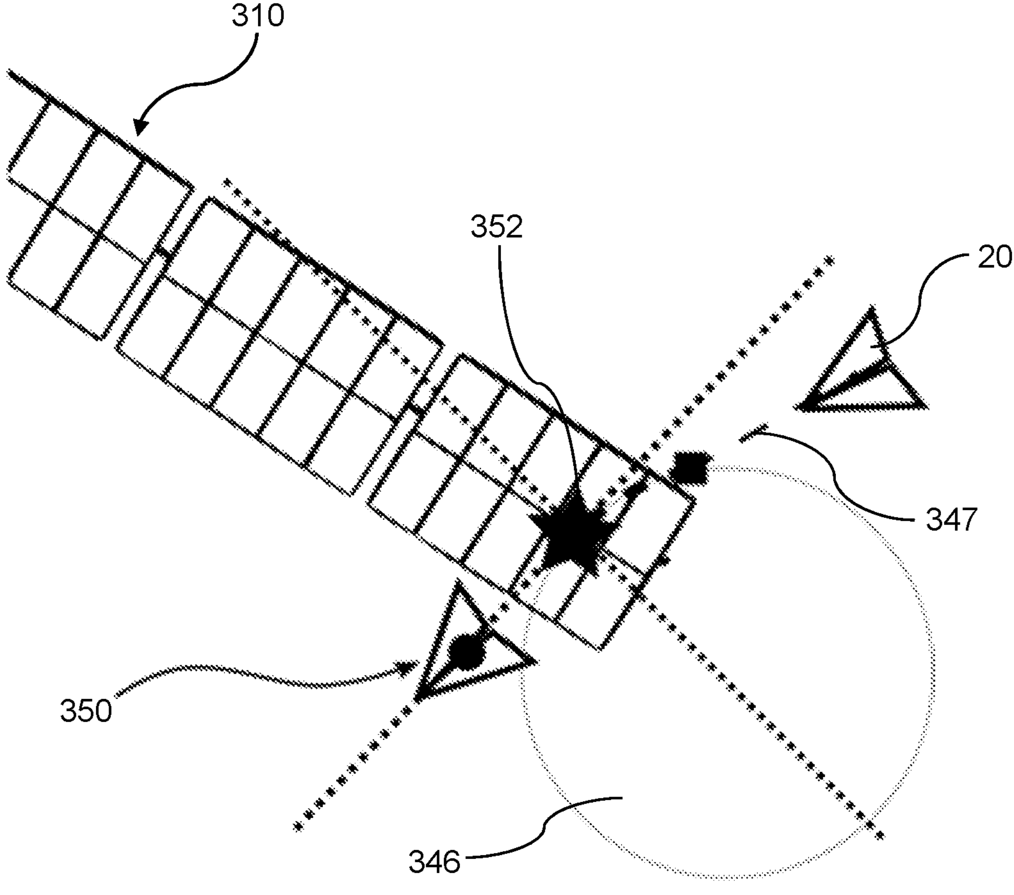
FIG. 15B is a plan view diagram of shortening the orbiting path.

Alternatively as shown in FIG. 15B, the orbiting path 342 can be shortened by flying the UAV 20 along the inner tangent 347 of the right target turning circle 346 instead and flying over the PV array 310. The UAV 20 initially in the TR zone and the camera 222 is forward-facing the target view 352. When the UAV 20 flies over the PV array 310 and specifically over the target view 352 towards the target point 350, the camera 222 changes from forward-facing to backward-facing. This allows the camera 222 to continuing facing the target view 352 when the UAV 20 flies over it and arrives at the target point 350.

Target points 350 can be in close proximity to each other without any obstacle 320 in between, such as target points 350 that correspond to adjacent PV arrays 310. A pair of target points 350 are adjacent to each other and the flight path 340 between them can be simplified to a straight-line shift. This allows the UAV 20 to fly along the straight flight path 340 with a shorter flight duration, while maintaining the same height, yaw angle ($\alpha_{yaw}$), and pitch angle ($\alpha_{pitch}$).

The TOUR function includes a step of controlling the UAV 20 for automated manoeuvre at the respective one or more target points 350 to capture the EL visual dataset of each PV array 310 using the camera 222. Accordingly, when the UAV 20 reaches a target point 350 (such as target point A') looking at a corresponding target view 352 (such as target view A), the UAV 20 is controlled for automated manoeuvre at the target point A' to capture the EL visual dataset of the corresponding PV array 310. In this automated manoeuvre, the UAV 20 may move from target point A' (looking at the target view A) to target point B' (looking at the target view B) to capture the EL visual dataset of the PV array 310 that is bounded by the side points A and B. The scanning paths 360 of this automated manoeuvre are shown in dotted lines in FIG. 3B and is further described below in the method 440 or the SCAN function.

Figure 16:
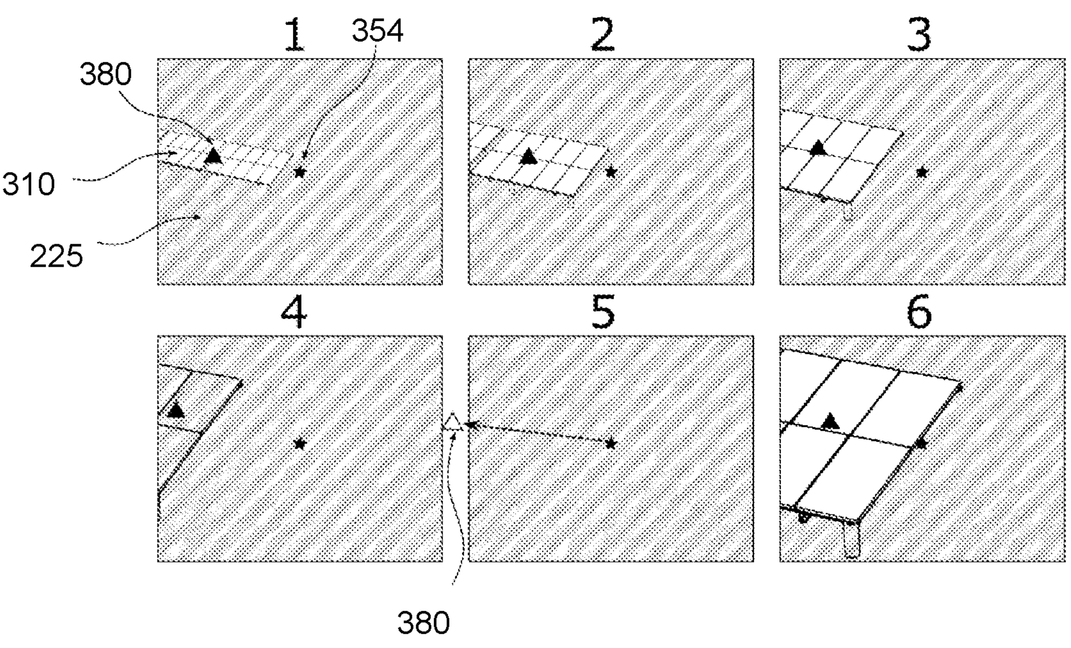
FIG. 16 shows the camera's FOV facing an incorrect target view as the UAV approaches the PV array.

In some cases, the EL measurement plan from the PLAN function may contain errors such as incorrect coordinates for a target point 350. For example, a target point 350 should correspond to a particular target view 352 but if the coordinates for the target point 350 are incorrect, such as due to measurement errors, the UAV 20 may not face the correct target view 352 when it arrives at these coordinates via the TOUR function. Instead, as shown in FIG. 16, the UAV 20 would be facing an incorrect target view 354 as it approaches the PV array 310. As the UAV 20 approaches the PV array 310, the camera 222 may detect the EL signal from the PV array 310 and a PV array subsection may appear in the camera's FOV 225. However, as the UAV 20 gets closer to the PV array 310, the PV array subsection may shift out of the FOV 225, resulting in the camera 222 losing the EL signal and the FOV 225 focusing on the incorrect target view 354. When the PV array subsection is visible in the FOV 225 as the UAV 20 approaches the PV array 310, a reference point 380 on the PV array subsection that is currently visible in the FOV 225 can be determined. For example, the reference point 380 is the centre 522 of the rectangle 520 described below for the SCAN function. When the UAV 20 is close enough to the PV array 310, the PV array subsection disappears from the FOV 225 and the reference point 380 cannot be determined. The reference point 380 of the PV array subsection that was last visible in the FOV 225 before it disappeared, i.e. the last reference point 380, is transformed into a corrected target point 350 based on the current position and orientation of the UAV 20.

The UAV 20 can be controlled to move from the current target point 350 (with the incorrect coordinates and facing the incorrect target view 354) to the corrected target point 350. The UAV 20 at the corrected target point 350 would be facing the last reference point 380 and a PV array subsection would be visible in the FOV 225, allowing the UAV 20 to continue with the SCAN function. In one embodiment, the TOUR function determines, upon losing the PV array subsection from the FOV 225, the last reference point 380 and corrected target point 350. The TOUR function also recalculates the flight path 340 from the current position of the UAV 20 to the corrected target point 350 and automatically moves the UAV 20 from the current position to the corrected target point 350. In another embodiment, after determining the last reference point 380 and corrected target point 350, the corrected target point 350 is displayed on the remote device 260 controlling the UAV 20. The pilot then selects the corrected target point 350 to recalculate the flight path from the current position of the UAV 20 to the corrected target point 350 and control the UAV 20 to move to the corrected target point 350. Additionally, after losing the EL signal, a warning message may be sent to the remote device 260 to alert the pilot and provide an option to correct the target point 350 based on the last reference point 380.

Therefore, the TOUR function controls the UAV 20 to fly towards a target point 350 to capture the EL visual dataset of the corresponding PV array 310. If the EL signal of the PV array 310 is detected by the camera 222, the TOUR function proceeds to the method 440 of the process 400 or the SCAN function to capture the EL visual dataset of the PV array 310. After capturing the EL visual dataset of the PV array 310, the UAV 20 flies towards the next target point 350 via the TOUR function to capture the EL visual dataset of the next PV array 310. However, if the EL signal is not detected, this may mean that the PV array 310 is inactive or the target point 350 is erroneous. The TOUR function then proceeds to correct the target point 350, as described above. However, if despite this correction the PV array 310 is still not detected by the camera 222, the TOUR function may proceed to a method 450 of the process 400 representing a FIND function to find the nearest active PV array 310 with an EL signal. Details of the FIND function are described in PCT Application WO 2021137764 (incorporated by reference herein).

Figure 17:
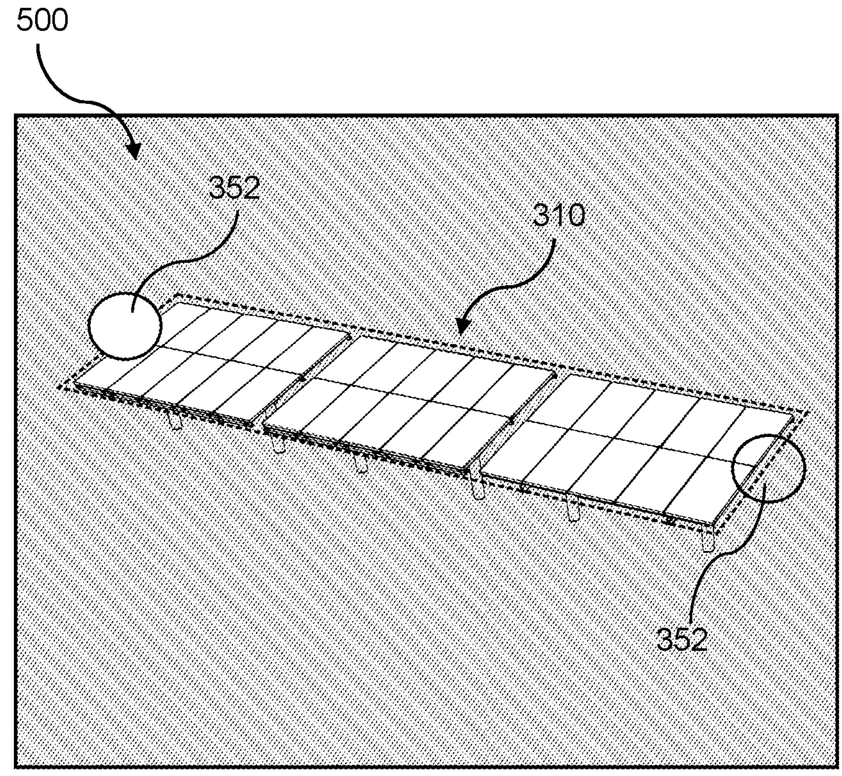
FIG. 17 is an interactive map for controlling the UAV.

As mentioned above, the TOUR function executes automated flight manoeuvres along the flight paths 340 based on the EL measurement plan which includes location details of the target points 350 and the flight manoeuvres. In some situations, there is no EL measurement plan or the EL measurement plan does not contain sufficient details about the target points 350 and/or flight manoeuvres. The target points 350 would be determined based on the pilot's interaction with the remote device 260 controlling the UAV 20. A software executed in the remote device 260 displays an interactive map 500 as shown in FIG. 17. When the UAV 20 is in flight and the camera 222 sees a PV array 310, a PV array subsection appears in the interactive map 500. The pilot may select a side point 352 of the PV array subsection. The software then generates a target point 350 based on the selected side point 352 and the current position and orientation of the UAV 20, similar to transformation of the last reference point 380 to the corrected target point 350 described above. The pilot selects another function to calculate a flight path 340 and control the UAV 20 to fly towards the generated target point 350. Hence, through the interactive map 500, the TOUR function can generate a series of target points 350 and calculated their flight paths 340 based on selected points, such as the side points 352, of the PV arrays 310. This obviates the need for the EL measurement plan or knowing the target points 350 beforehand, although more manual controls by the pilot would be required.

SCAN Function

The process 400 includes the method 440 representing the SCAN function for automated imaging of a PV array 310 using the UAV 20, wherein the PV array 310 corresponds to target points 350 for the UAV 20. For example, the target points 350 include the target points A' and B' as shown in FIG. 6, which respectively correspond to target views 352 or side points A and B of the PV array 310. In many embodiments, the SCAN function executes automated EL measurement of the PV array 310.

The SCAN function includes a step of positioning the UAV 20 at one of the target points 350 corresponding to the PV array 310. For example, the UAV 20 is controlled using the TOUR function for automated flight along the respective flight path 340 to the target point 350 (such as target point A'). The SCAN function further includes a step of controlling the UAV 20 for automated manoeuvre between the target points 350 to capture the EL visual dataset of the PV array 310. For example, the UAV 20 performs the automated manoeuvre from the target point A' to the target point B' along the sideward scanning direction 360 to capture the EL visual dataset.

The SCAN function can be divided into six incremental levels (Level 0 to Level 5) of automation for the automated EL measurement, wherein SCAN function Level 0 requires full manual control by the UAV pilot and SCAN function Level 5 requires the least manual control or is fully automated.

In SCAN function Level 0, the UAV 20 is manually controlled by the pilot and flown between the target points 350 (such as between target points A' and B'). The pilot also manually aligns the camera's optical axis 222*a* to be perpendicular to the PV array 310. For optimal EL measurement, the pilot sets a distance between the UAV 20 and the PV array 310 such that the short side of a PV array subsection is fully within the FOV 225, preferably filling most of the FOV 225. The pilot may also manually adjust various parameters of the camera 222, some of which are described in PCT Application WO 2021137764 (incorporated by reference herein). Non-limiting examples of the camera parameters include camera focus, exposure, signal-to-noise ratio, and sharpness.

Figure 18:
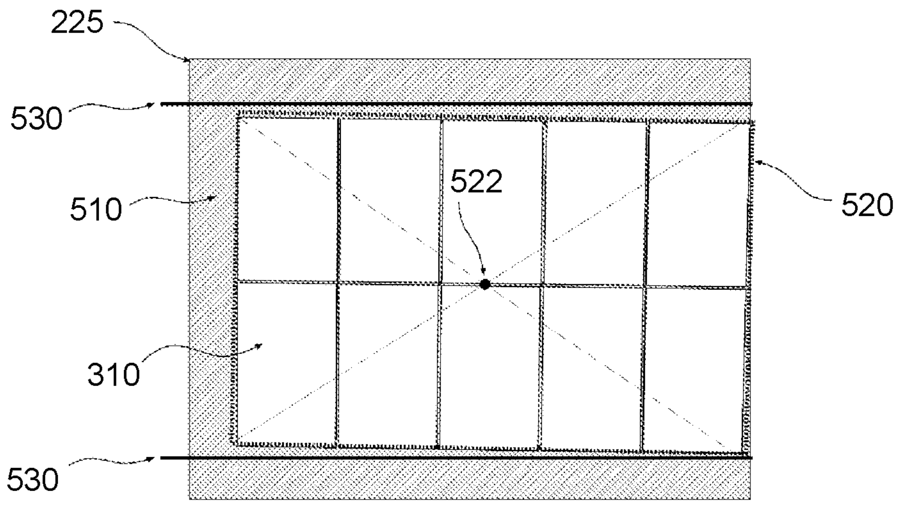
FIG. 18 is the camera's FOV showing a polygonal outline of a PV array subsection.

In SCAN function Level 1, the alignment of the PV array subsection with the FOV 225 is performed via the automated manoeuvre after the UAV 20 is positioned at the target point 350. The automated manoeuvre includes a step of aligning the FOV 225 to the PV array subsection (i.e. the portion of the PV array 310 that is currently captured by the image sensor of the camera 222). As shown in FIG. 18, as the EL signal of a forward bias PV array 310 in the FOV 225 is usually significantly larger than the inactive background 510, the EL signal of a PV array subsection of the PV array 310 can be identified and aligned to the FOV 225.

In some embodiments, the step of aligning the FOV 225 includes detecting a polygonal outline of the PV array subsection. The EL signal or image of the PV array subsection can be outlined by a polygon such as a quadrilateral or more preferably a rectangle as PV modules 314 are rectangular and PV arrays 310 are usually arranged in a regular fashion. If the camera's optical axis 222*a* is almost perpendicular to the PV array 310, the polygon can be approximated as a rectangle 520 having a centre 522 ($x_R$, $y_R$), width ($w_R$), height ($h_R$), and rotation angle ($a_R$), as shown in FIG. 18.

As an example, detecting the polygonal outline (rectangle 520) can be described by an image processing algorithm as follows. The image processing algorithm includes converting an EL image frame of the PV array subsection from the EL visual dataset into monochrome or grayscale if it originally has multiple colour channels. The image processing algorithm includes binarizing the EL image frame by setting all image intensities above a predefined threshold to a non-zero value (e.g. 1) and other image intensities to zero. Otsu's method for automatic image thresholding can be used to obtain this threshold. The image processing algorithm further includes detecting contours around all non-zero objects in the binarized EL image frame and the rectangle 520 is defined around the detected contours. More specifically, the image processing algorithm excludes small objects from the detected contours to exclude objects from non-EL sources and finds the smallest rectangle 520 around all the remaining detected contours.

Figure 19:
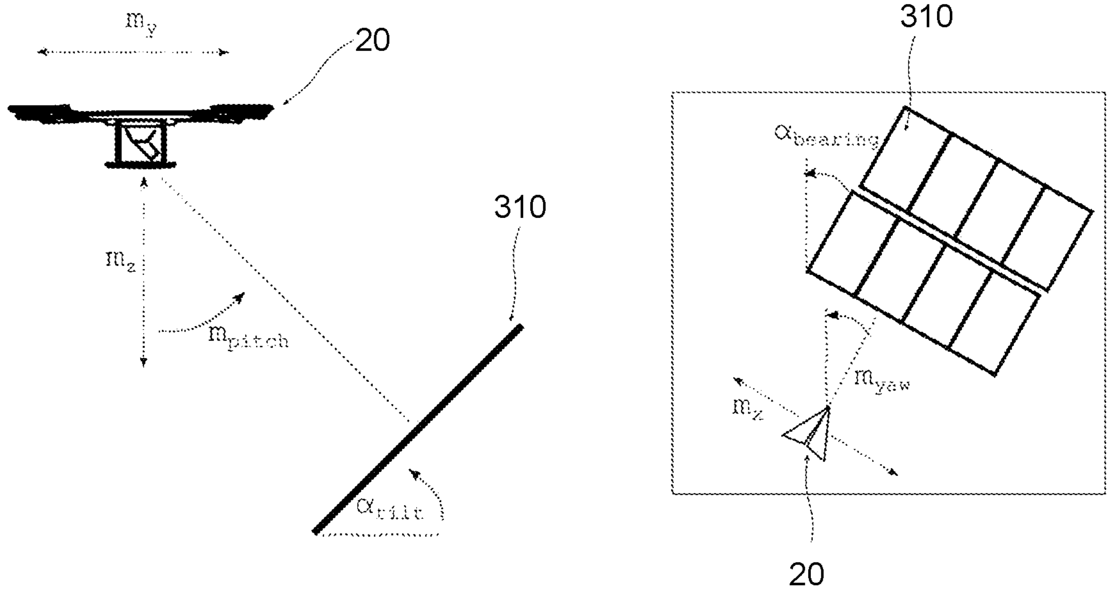
FIG. 19 are side and plan view diagrams of the PV array and UAV to derive misalignment parameters for aligning the camera's FOV.

Referring to FIG. 19, the step of aligning the FOV 225 further includes calculating a pitch angle misalignment ($m_{pitch}$) based on the detected polygonal outline (rectangle 520). The step of aligning the FOV 225 further includes adjusting the camera's pitch angle ($\alpha_{pitch}$) by the pitch angle misalignment ($m_{pitch}$), such that the rectangle 520 is centred in the FOV 225. More specifically, the rectangle 520 is centred to the longitudinal centre ($y_c$) of the FOV 225, wherein the longitudinal centre ($y_R$) of the rectangle 520 coincides with the lateral centre line passing through the longitudinal centre ($y_c$) of the FOV 225. The pitch angle misalignment ($m_{pitch}$) can be calculated as follows.

$$m_{pitch} = \frac{y_c - y_R}{y_c}$$

In some embodiments, instead of detecting the polygonal outline, the step of aligning the FOV 225 includes calculating an image histogram of the EL image frame and calculating a centre of the EL image frame based on the image histogram. For example, the EL image frame centre ($y_R$) can be calculated from the centre of the peak obtained from the value sum of average of the rows and columns in the image histogram. Although the EL image frame centre ($y_R$) and size can be calculated, the rotation angle ($\alpha_R$) may be missing but this, as well as other missing information, can be obtained through other methods or sources. Alternatively, in some embodiments, a bounding box technique can be used to detect the PV array subsection or each PV module 314 in the PV array subsection.

In SCAN function Level 1, the automated manoeuvre automates alignment of the FOV 225 by adjustment of the camera's pitch angle ($\alpha_{pitch}$). The pilot manually controls the UAV 20 to perform other adjustments to improve alignment of the FOV 225 to the PV array subsection.

In SCAN function Level 2, the automated manoeuvre optimizes the alignment of the FOV 225 to the PV array subsection. More specifically, the step of aligning the FOV 225 may include aligning a pair of guide lines 530 of the FOV 225 to the PV array subsection. In embodiments wherein the SCAN function is performed along the sideward scanning direction 360*a*, the guide lines 530 are upper and lower lines offset by distance ($d_T$) from the top and bottom edges of the FOV 225. A smaller offset distance ($d_T$) allows the PV array subsection to fill a larger area of the FOV 225, but requires the camera 222 to have better positional stability and precision. Preferably, the offset distance ($d_T$) is about 10% of the overall height ($h_{FOV}$) of the FOV 225.

The rectangle 520 may be rotated relative to the PV array subsection and the step of aligning the FOV 225 may include calculating a rotational misalignment ($m_{yaw}$) between the rectangle 520 and the PV array subsection based on the offset guide lines 530 and the rotated rectangle 520. The rotational misalignment ($m_{yaw}$) is calculated from the smallest angular difference between the rotation angle ($\alpha_R$) of the rotated angle 520 and the offset guide lines 530. The step of aligning the FOV 225 further includes adjusting the yaw angle ($\alpha_{yaw}$) of the camera 222 by the rotational misalignment ($m_{yaw}$), such as by rotating the UAV 20 about the yaw axis 210*a*.

Figure 20:
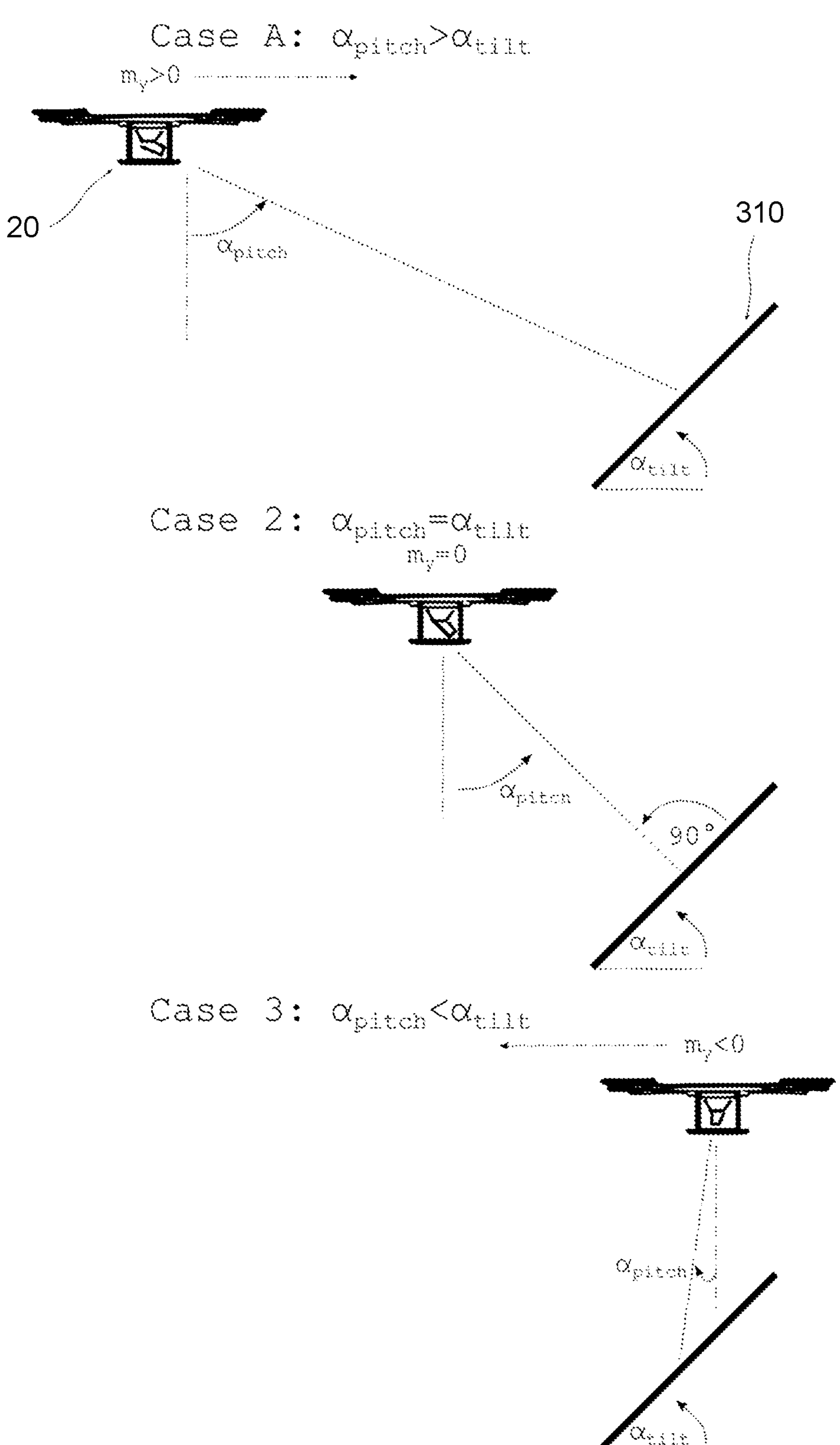
FIG. 20 is a side view diagram of the PV array and UAV with different current pitch angles of the camera relative to the tilt angles of the PV array.

The step of aligning the FOV 225 further includes calculating a roll axis misalignment ($m_y$) based on the angular difference between the current pitch angle ($\alpha_{pitch}$) and desired pitch angle of the camera 222. Notably, the desired pitch angle is equivalent to the tilt angle ($\alpha_{tilt}$) of the PV array 310. FIG. 20 shows three cases in which the current pitch angle ($\alpha_{pitch}$) is larger (Case A), equal (Case B), and smaller (Case C) than the desired pitch angle/tilt angle ($\alpha_{tilt}$) of the PV array 310. The step of aligning the FOV 225 further includes manoeuvring the UAV 20 along the roll axis 210*b* by the roll axis misalignment ($m_y$), such that the camera's optical axis 222*a* is perpendicular to the PV array 310. If the roll axis misalignment ($m_y$) is negative, the UAV 20 should be shifted backward along the roll axis 210*b* and away from the PV array 310. If the roll axis misalignment ($m_y$) is positive, the UAV 20 should be shifted forward along the roll axis 210*b* and towards the PV array 310.

The step of aligning the FOV 225 further includes calculating a vertical misalignment ($m_z$) based on the offset guide lines 530 and the rotated rectangle 520, as follows.

$$m_z = \frac{h_R - (h_{FOV} - 2d_T)}{h_{FOV} - 2d_T}$$

The vertical misalignment ($m_z$) is negative if the PV array subsection fills up too small an area within the FOV 225 and the UAV 20 should be shifted vertically downwards to enlarge the PV array subsection in the FOV 225. However, if the distance between the UAV 20 and the PV array 310 is below a predefined minimum safety distance, the negative vertical misalignment ($m_z$) should be reset to zero to prevent the UAV 20 from colliding with the PV array 310. The vertical misalignment ($m_z$) is positive if the PV array subsection fills up too large an area within the FOV 225 and the UAV 20 should be shifted vertically upwards to shrink the PV array subsection in the FOV 225. However, if the vertical misalignment ($m_z$) is positive and the roll axis misalignment ($m_y$) is positive, this means the UAV 20 is vertically too close to the PV array 310 and the roll axis misalignment ($m_y$) should be reset to zero to prevent the UAV 20 from colliding with the PV array 310.

In SCAN function Level 2, the automated manoeuvre automates alignment of the FOV 225 by one or more of the following misalignment parameters—pitch angle misalignment ($m_{pitch}$), rotational misalignment ($m_{yaw}$), roll axis misalignment ($m_y$), and vertical misalignment ($m_z$). Adjustment of the UAV 20 and/or camera 222 by the misalignment parameters for alignment with the PV array subsection can be done by speed control and/or positional control as described above. Once the PV array subsection edges align with the guide lines 530 through the automated manoeuvre, all misalignment parameters are reset to zero, causing the UAV 20 to hover in place. The pilot may manually control the UAV 20 to perform other alignment adjustments if necessary, or to override the automated manoeuvre. For example, the pilot may need to counteract alignment actions by the automated manoeuvre due to inaccurate or false calculations of the misalignment parameters.

In SCAN function Level 3, after the FOV 225 has been aligned to the PV array subsection, the automated manoeuvre controls movement of the UAV 20 to move the UAV 20 along the PV array 310 and capture the EL visual dataset of the PV array 310. The automated manoeuvre includes a step of determining a scanning direction 360 for moving the UAV 20 between the target points 350. For example, if the positions of the target points A' and B' are known beforehand, the scanning direction 360 can be determined from the known positions, wherein the UAV 20 is controlled to move from start target point A' to end target point B'.

In some embodiments, the scanning direction 360 can be determined based on the pitch axis misalignment ($m_x$) between the aligned FOV 225 and the PV array subsection. The pitch axis misalignment ($m_x$) can be calculated as follows.

$$m_x = \frac{x_c - x_R}{x_c}$$

Figure 21:
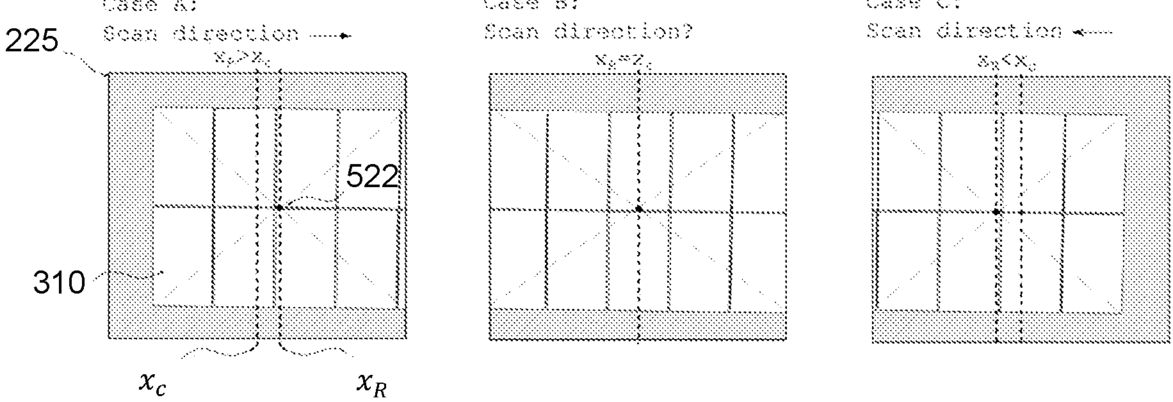
FIG. 21 shows the camera's FOV with different positions of a PV array subsection inside the FOV.

With the PV array subsection aligned inside the FOV 225, the scanning direction 360 can be determined if a side point 352 of the PV array subsection is inside the FOV 225. With reference to FIG. 21, in Case A, the left side point 352 is inside the FOV 225, the lateral centre ($x_R$) of the rectangle 520 is on the right of the longitudinal centre line passing through the lateral centre ($x_c$) of the FOV 225, i.e. $x_R > x_c$, and the scanning direction 360 would be sidewards to the right. In Case C, the right side point 352 is inside the FOV 225, the lateral centre ($x_R$) of the rectangle 520 is on the left of the longitudinal centre line of the FOV 225, i.e. $x_R < x_c$, and the scanning direction 360 would be sidewards to the left. In Case B, no side point 352 is visible inside the FOV 225, i.e. $x_R \approx x_c$, and the pilot needs to manually shift the UAV 20 along the pitch axis (parallel to the scanning direction 360) until one of the side points 352 is visible.

After determining the scanning direction 360, i.e. either sidewards to the left or right, the automated manoeuvre includes a step of capturing the EL visual dataset of the PV array 310 starting from the PV array subsection as the UAV 20 moves along the scanning direction 360 between the target points 350. More specifically, at different points along the scanning direction 360, the UAV 20 captures an EL visual dataset, including comprising a series of EL image frames and/or a video, of different PV array subsections. The automated manoeuvre may gradually increase the UAV movement speed as the UAV 20 moves along the scanning direction 360 to minimize jerky movements. Additionally, the automated manoeuvre may continue calculating the misalignment parameters as the UAV 20 moves along the scanning direction 360 and reduce the movement speed if the misalignment parameters breach certain predefined conditions, such as if the absolute value of an individual misalignment parameter is too large which may suggest the FOV 225 is no longer properly aligned to a PV array subsection. The automated manoeuvre may stop the capturing once the UAV 20 reaches the other target point 350 (end target point B').

In SCAN function Level 4, the SCAN function may include a step of receiving geolocation data of the UAV 20. The geolocation data, such as from a GPS module in the UAV 20, improves positioning of the UAV 20 during the automated manoeuvre. As the UAV approaches the other target point 350 (end target point B') at the end of the scanning direction or path 360, the absolute value of the pitch axis misalignment ($m_x$) increases and the movement speed decreases so that the UAV 20 should stop at the end target point B'. However, due to the UAV's inertia, the deceleration might be insufficient to overcome the movement speed as the UAV 20 approaches the end target point B'. This causes the pitch axis misalignment ($m_x$) to continue increasing and the UAV 20 to overshoot the end target point B'. Moreover, the UAV 20 may overshoot and hover at a position where the no PV array subsection is visible in the FOV 225. Without any PV array subsection visible in the FOV 225, the automated manoeuvre cannot be performed, and the UAV 20 may not be able to fly to the next target point 350 to continue capturing the EL visual dataset. To counteract this issue, the SCAN function may include a step of returning the UAV 20 to a last position based on the geolocation data, wherein at the previous position, the PV array subsection was last visible in the FOV 225 and/or the pitch axis misalignment ($m_x$) was below a predefined absolute value (e.g. 0.7).

In some cases, the PV array 310 may have gaps and/or broken PV modules 314, resulting in some areas of the PV array 310 without any EL signal and the UAV 20 would not be able to detect these areas for EL measurement. If these areas are wider than the overall width ($w_{FOV}$) of the FOV 225, the automated manoeuvre may stop the capturing of EL visual dataset before or after the UAV 20 reaches the end target point 350. For example, the automated manoeuvre may stop the capturing at the start of these areas without any EL signal from the perspective of the FOV 225 as the UAV 20 moves along the scanning direction 360.

In SCAN function Level 5, details of the target points 350 and the orientation of the UAV 20 and camera 222 to align to the corresponding PV array 310 at the respective target points 350 and target views 352 are known beforehand, such as from the PLAN function.

The SCAN function includes the step of positioning the UAV 20 at one of the target points 350 corresponding to the PV array 310. For example, the UAV 20 is controlled using the TOUR function for automated flight to the start target point 350. The SCAN function includes the step of controlling the UAV 20 for automated manoeuvre between the target points 350 to capture the EL visual dataset of the PV array 310. The automated manoeuvre includes the steps of aligning the camera's FOV 225 to a PV array subsection of the PV array 310 and determining the scanning direction 360 for moving the UAV 20 between the target points 350. As the orientation of the UAV 20 and camera 222 is known beforehand, the FOV 225 would be properly aligned upon positioning of the UAV 20 at the start target point 350 and the scanning direction 360 is also known (from the start to the end target points 350). The automated manoeuvre includes the step of capturing the EL visual dataset of the PV array 310 starting from the PV array subsection as the UAV 20 moves along the scanning direction 360 between the start and end target points 350. The SCAN function Level 5 thus fully automates EL measurement of the PV array 310, starting the capturing of EL visual dataset once the UAV 20 is positioned at the start target point 350 and ending once the UAV 20 reaches the end target point 350.

Although the SCAN function is described in embodiments herein that the UAV 20 captures the EL visual dataset while moving along the sideward scanning direction 360*a* (see FIG. 7A), it will be appreciated that various aspects of the SCAN function can apply similarly or analogously to the forward scanning direction 360*b* (see FIG. 7B). It will also be appreciated that the calculation of misalignment parameters and alignment adjustments can be modified accordingly for the forward scanning direction 360*b*. For example, instead of the pitch angle ($\alpha_{pitch}$), the roll angle ($\alpha_{roll}$) of the camera 222 is used to align to the tilt angle ($\alpha_{tilt}$) of the PV array 310. The roll angle misalignment parameter would be calculated instead of the pitch angle misalignment ($m_{pitch}$). For example, the guide lines 530 would be left and right lines offset by distance ($d_T$) from the left and right edges of the FOV 225.

COMBI Function

In some embodiments, the TOUR and SCAN functions can be combined as a COMBI function or method 460 of the process 400. The COMBI function provides a method for automated flight of the UAV 20 and automated imaging of a set of PV arrays 310 using the UAV 20. The COMBI function can be initiated if a complete measurement plan from the PLAN function is available. In many embodiments, the COMBI function executes automated flight of the UAV 20 and automated EL measurement of the PV arrays 310 using the UAV 20, and the COMBI function can be initiated if a complete EL measurement plan is available.

The COMBI function includes a step of determining flight paths 340 between target points 350 for capturing EL visual datasets of the PV arrays 310, each PV array 310 corresponding to a pair of start and end target points 350 (e.g. target points A' and B'). The COMBI function includes a step of controlling the UAV 20 for automated flight along the flight paths 340 to the respective start target points 350 of the PV arrays 310. The COMBI function includes a step of controlling the UAV 20 for automated manoeuvre between the respective start and end target points 350 of each PV array 310 to capture the EL visual dataset of the PV array 310 using the camera 222. For each PV array 310, the automated manoeuvre includes steps of aligning the camera's FOV 225 to a PV array subsection of the PV array 310, determining a scanning direction 360 for moving the UAV 20 between the start and end target points 350, and capturing, using the camera 222, the EL visual dataset of the PV array 310 starting from the PV array subsection as the UAV 20 moves along the scanning direction 360 between the start and end target points 350.

It will be appreciated that various aspects of the TOUR and SCAN functions described above can apply similarly or analogously to the COMBI function, and vice versa, and are not further described for purpose of brevity.

As described above, the channels 34 can be selectively activated, such as by an onsite worker or by the remote device 260, to put the PV strings 312 under forward bias conditions and generate EL signals from the PV arrays 310. Preferably, the remote device 260 is able to control the UAV 20 and channels 34 so that execution of the EL measurement plan via the COMBI function can be fully automated with minimal or no human intervention. However, even if the COMBI function is fully automated, the pilot and other on-site workers should remain observant of the UAV 20 to ensure safe management and to prevent accidents. For example, the remote controller held by the pilot can include a dead man's switch that has to be pressed continuously or periodically. For example, the UAV 20 may be configured with another camera or eye tracker that tracks the pilot's eyes to ensure the pilot's attention on the UAV 20.

After completing the SCAN or COMBI function, the captured EL visual datasets of the PV arrays 310 may undergo further image processing to obtain the processed EL images of the PV arrays 310. Examples of such image processing are described in PCT application WO 2021137764 (incorporated by reference herein). For example, raw EL images from the EL visual datasets may be extracted and sent for an image enhancement process. Multiple processed EL images of the PV array subsections may be aligned and combined to form a combined processed EL image of the corresponding PV array 310. The processed EL images of the PV arrays 310 may be mapped onto a base map of the PV installation 300 for better visualization of the processed EL images against the PV installation 300.

Details of the processed EL images, such as image properties, electrical currents used for the EL measurements, and identifiers of the respective PV arrays 310, may be stored on a database for further analysis. This database allows for quantitative comparison of the processed EL images with historical EL images of the same PV arrays 310. For example, a pixel intensity histogram of an EL image depends on the electrical current as well as camera parameters such as exposure time, gain, ISO, aperture, and transmissivity of the lens 223. The pixel intensities have a range of values, such as 0 to 255 for an 8-bit camera 222, and these values can be mapped to absolute luminescence intensity values based on a technical standard. Since properties of the EL images can vary depending on the type of camera 222, camera properties, different EL images of the same PV array 310 can be mapped according to the absolute luminescence intensity values for quantitative comparison. This technical standard can also be used by different EL measurement contractors so that their EL images are comparable with others.

Embodiments of the present disclosure herein describe the process 400 for automated flight to the PV arrays 310 and automated imaging (such as EL measurements) of the PV arrays 310. The process 400 describes the various key functions including the DATA, PLAN, TOUR, SCAN, AND COMBI functions, as well as the various automation levels of the SCAN function. The automated flight and automated imaging reduce the overall time taken to complete the imaging of the PV arrays 310. The UAV 20 can execute the process 400 and operate independently with minimal or no human intervention. The process 400 is thus feasible for imaging of large PV installations 300 with many PV arrays 310. More PV arrays 310 can be measured at a faster rate and with less manpower, thereby improving overall efficiency. The quality of the EL visual datasets and processed EL images would also be better as the UAV 20 is more properly aligned to the PV arrays 310 by the automated manoeuvre.

In the foregoing detailed description, embodiments of the present disclosure in relation to aerial vehicles and methods for automated flight and automated imaging of PV arrays according to the present disclosure are described with reference to the provided figures. Although these embodiments are described in relation to EL or electroluminescence measurements of PV arrays, the aerial vehicles and methods described herein may be used with other imaging technologies such as visual, thermal (infrared), ultra-violet (UV) fluorescence, and photoluminescence (PL) imaging. For example for PL imaging, photoluminescence of the PV arrays can be created with a light source instead of a power supply. For example for UV fluorescence, fluorescence signals from the PV arrays can be created by illuminating the PV arrays with UV light. It will be appreciated that various aspects of the embodiments described herein in relation to EL imaging or measurements may apply similarly or analogously to other imaging technologies such as visual, infrared, UV, and PL imaging.

The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A method for automated imaging of a photovoltaic (PV) array using an aerial vehicle, the PV array corresponding to a plurality of target points for the aerial vehicle, the method comprising:

positioning the aerial vehicle at a first target point of the plurality of target points corresponding to the PV array; and controlling the aerial vehicle for an automated manoeuvre to capture a visual dataset of the PV array, the automated manoeuvre performed by the aerial vehicle comprising:

aligning a field-of-view (FOV) of a camera of the aerial vehicle to a PV array subsection of the PV array;

locating, in the aligned FOV, a first target view of the PV array and corresponding to the first target point;

determining, based on an arrangement of the aerial vehicle relative to the PV array and in response to said locating of the first target view, a scanning direction with respect to the first target view for moving the aerial vehicle from the first target point;

moving the aerial vehicle along the scanning direction from the first target point towards a second target point of the plurality of target points, the second target point corresponding to a second target view of the PV array; and capturing, using the camera, the visual dataset of the PV array between the first and second target views of the PV array subsection as the aerial vehicle moves along the scanning direction between the first and second target points.

2. The method according to claim 1, wherein aligning the FOV comprises detecting a polygonal outline of the PV array subsection.

3. The method according to claim 2, wherein aligning the FOV comprises calculating a pitch angle misalignment based on the detected polygonal outline.

4. The method according to claim 2, wherein aligning the FOV comprises calculating a roll axis misalignment based on an angular difference between a current pitch angle of the camera and a desired pitch angle.

5. The method according to claim 2, wherein aligning the FOV comprises aligning a pair of guide lines of the FOV to the PV array subsection, the guide lines being offset from edges of the FOV.

6. The method according to claim 5, wherein aligning the FOV comprises calculating a rotational misalignment between the polygonal outline and the PV array subsection based on the offset guide lines and the polygonal outline.

7. The method according to claim 5, wherein aligning the FOV comprises calculating a vertical misalignment based on the offset guide lines and the polygonal outline.

8. The method according to claim 1, wherein the scanning direction is determined based on a pitch axis misalignment between the aligned FOV and the PV array subsection.

9. The method according to claim 1, wherein the automated manoeuvre comprises calculating misalignment parameters as the aerial vehicle moves along the scanning direction and reducing movement speed of the aerial vehicle if the misalignment parameters breach predefined conditions.

10. The method according to claim 1, further comprising:

receiving geolocation data of the aerial vehicle; and returning the aerial vehicle to a previous position based on the geolocation data, wherein at the previous position, the PV array subsection was last visible in the FOV.

11. A method for automated flight of an aerial vehicle to perform imaging of a set of photovoltaic (PV) arrays, the method comprising:

determining flight paths between target points for capturing visual datasets of the PV arrays, each PV array corresponding to a respective plurality of the target points;

controlling the aerial vehicle for automated flight along the flight paths to a respective first target point of the respective plurality of target points corresponding to each PV array; and controlling the aerial vehicle for an automated manoeuvre to capture the visual datasets of each PV array using a camera of the aerial vehicle, wherein the automated manoeuvre comprises moving the aerial vehicle along a scanning direction from the respective first target point to a respective second target points of the respective plurality of target points, the scanning direction determined with respect to a first target view of the PV array and based on an arrangement of the aerial vehicle relative to the PV array and in response to locating the first target view of the PV array in a field-of-view (FOV) of the camera that is aligned to the PV array.

12. The method according to claim 11, wherein each flight path is calculated using a 3D spline function, and wherein a length of said each flight path is minimized by adjusting positions of knots of the 3D spline function, wherein said each flight path does not intersect with any obstacle and is above a predefined minimum height.

13. The method according to claim 11, wherein the flight path to the first target point comprises an orbiting path circling around and towards the respective first target point such that the camera always faces the PV array corresponding to the respective first target point as the aerial vehicle flies along the flight path to the respective first target point.

14. The method according to claim 13, wherein the orbiting path comprises a target turning circle tangential to the respective first target point, and wherein the automated flight comprises flying the aerial vehicle along (i) an outer tangent of the target turning circle or (ii) an inner tangent of the target turning circle and over the PV array.

15. The method according to claim 11, further comprising determining a reference point on a PV array subsection of the PV array, the PV array subsection visible in a field-of-view (FOV) of the camera as the aerial vehicle approaches the PV array.

16. The method according to claim 15, further comprising:

losing the PV array subsection from the FOV; and determining, upon losing the PV array subsection from the FOV, a last reference point of the PV array subsection that was last visible in the FOV.

17. The method according to claim 16, further comprising transforming the last reference point into a corrected target point and recalculating a respective flight path from a current position of the aerial vehicle to the corrected target point.

18. A method for automated flight of an aerial vehicle and automated imaging of a set of photovoltaic (PV) arrays using the aerial vehicle, the method comprising:

determining flight paths between target points for capturing visual datasets of the PV arrays, each PV array corresponding to a respective plurality of the target points;

controlling the aerial vehicle for automated flight along the flight paths to a respective first target point of the respective plurality of target points corresponding to each PV array; and controlling the aerial vehicle for automated to capture the visual dataset of the PV array using a camera of the aerial vehicle, the automated manoeuvre performed by the aerial vehicle comprising:

aligning a field-of-view (FOV) of the camera to a PV array subsection of the PV array;

locating, in the aligned FOV, a respective first target view of the PV array and corresponding to the respective first target point corresponding to the PV array;

determining, based on an arrangement of the aerial vehicle relative to the PV array and in response to said locating of the respective first target view, a scanning direction with respect to the respective first target view for moving the aerial vehicle from the respective first target points;

moving the aerial vehicle along the scanning direction from the respective first target point towards a respective second target point of the respective plurality of target points, the respective second target point corresponding to a respective second target view of the PV array; and capturing, using the camera, the visual dataset of the PV array between the respective first and second target views of the PV array subsection as the aerial vehicle moves along the scanning direction between the respective first and second target points.

19. The method according to claim 1, wherein the automated manoeuvre comprises determining, based on the arrangement of the aerial vehicle, camera, and PV array, the scanning direction to be:

a forward scanning direction, wherein both the aerial vehicle and the camera face perpendicular directions as the aerial vehicle moves forwardly along the forward scanning direction; or a sideward scanning direction, wherein both the aerial vehicle and the camera face forward as the aerial vehicle moves laterally along the sideward scanning direction.

20. The method according to claim 1, wherein the automated manoeuvre comprises:

moving the aerial vehicle forwardly along the scanning direction from the first target point to the second target point; and moving the aerial vehicle reversely along the scanning direction from the second target point to the first target point.

21. The method according to claim 11, wherein the scanning direction is determined, based on the arrangement of the aerial vehicle, camera, and PV array, to be:

a forward scanning direction, wherein the aerial vehicle and camera face perpendicular directions as the aerial vehicle moves forwardly along the forward scanning direction; or a sideward scanning direction, wherein the aerial vehicle and camera face forward as the aerial vehicle moves laterally along the sideward scanning direction.

22. The method according to claim 11, wherein the automated manoeuvre comprises:

moving the aerial vehicle forwardly along the scanning direction from the respective first target point to the respective second target point; and moving the aerial vehicle reversely along the scanning direction from the respective second target point to the respective first target point.

23. The method according to claim 18, wherein the automated manoeuvre comprises determining, based on the arrangement of the aerial vehicle, camera, and PV array, the scanning direction to be:

a forward scanning direction, wherein the aerial vehicle and camera face perpendicular directions as the aerial vehicle moves forwardly along the forward scanning direction; or a sideward scanning direction, wherein the aerial vehicle and camera face forward as the aerial vehicle moves laterally along the sideward scanning direction.

24. The method according to claim 18, wherein the automated manoeuvre comprises:

moving the aerial vehicle forwardly along the scanning direction from the respective first target point to the respective second target point; and moving the aerial vehicle reversely along the scanning direction from the respective second target point to the respective first target point.

25. The method according to claim 1, further comprising flying the aerial vehicle to the first target point, wherein a flight path to the first target point comprises an orbiting path circling around and towards the first target point, such that the camera always faces the PV array corresponding to the first target point as the aerial vehicle flies along the flight path to the first target point.

26. The method according to claim 25, wherein the orbiting path comprises a target turning circle tangential to the first target point, and wherein the aerial vehicle flies along (i) an outer tangent of the target turning circle or (ii) an inner tangent of the target turning circle and over the PV array.

27. The method according to claim 18, wherein the flight path to the respective first target point comprises an orbiting path circling around and towards the respective first target point, such that the camera always faces the PV array corresponding to the respective first target point as the aerial vehicle flies along the flight path to the respective first target point.

28. The method according to claim 27, wherein the orbiting path comprises a target turning circle tangential to the respective first target point, and wherein the automated flight comprises flying the aerial vehicle along (i) an outer tangent of the target turning circle or (ii) an inner tangent of the target turning circle and over the PV array.

* * * * *